(12) United States Patent
Randall et al.

(10) Patent No.: US 6,870,679 B2
(45) Date of Patent: Mar. 22, 2005

(54) MULTI-PASS CONFIGURATIONS

(75) Inventors: Geoff Randall, Ottawa (CA); Paul Colbourne, Ottawa (CA); David Moss, Orleans (CA); Michael R. E. Lamont, London (GB); Sheldon McLaughlin, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 198 days.

(21) Appl. No.: 10/164,697

(22) Filed: Jun. 10, 2002

(65) Prior Publication Data

US 2002/0196549 A1 Dec. 26, 2002

Related U.S. Application Data

(60) Provisional application No. 60/296,730, filed on Jun. 11, 2001.

(51) Int. Cl.[7] .................................................. G02B 1/10
(52) U.S. Cl. ........................ 359/580; 359/577; 398/81; 398/147; 398/159
(58) Field of Search ................................ 359/577, 578, 359/580, 584, 586, 588, 590, 615, 260, 337.5, 261, 589; 398/81, 136, 147, 149, 159, 192, 193, 208; 385/31, 49

(56) References Cited

U.S. PATENT DOCUMENTS

| | | | | |
|---|---|---|---|---|
| 3,696,310 A | * | 10/1972 | Paoli et al. ................... | 372/18 |
| 4,756,606 A | * | 7/1988 | Jewell et al. ................ | 359/241 |
| 5,557,468 A | * | 9/1996 | Ip ............................... | 359/615 |
| 6,028,706 A | * | 2/2000 | Shirasaki et al. ............ | 359/577 |
| 6,144,494 A | * | 11/2000 | Shirasaki et al. ............ | 359/578 |
| 6,343,866 B1 | * | 2/2002 | Cao et al. .................... | 359/868 |
| 6,621,632 B2 | * | 9/2003 | Zhou ............................ | 359/577 |
| 2002/0044738 A1 | | 4/2002 | Jablonski et al. ............. | 385/27 |

* cited by examiner

*Primary Examiner*—Thong Nguyen
*Assistant Examiner*—Arnel C. Lavarias
(74) *Attorney, Agent, or Firm*—Teitelbaum & MacLean; Neil Teitelbaum; Dough MacLean

(57) ABSTRACT

A method and device is disclosed for relaying a narrow diameter collimated optical beam carrying optical communication signal channels between a multilayer interference filters and another reflective surface avoiding signal loss by routing the optical beam to compensate for beam broadening caused by the multilayer interference filter. The method and device are particularly applicable to dispersion compensating filters, especially those wherein one filter is tunable, in that a controllable amount of dispersion is introduced to offset or compensate dispersion. Preferably one of the filters is a tunable periodic device in the form of a multi-cavity etalon structure. In a preferred embodiment of the filters can be designed to provide various controllable but different constant amounts of dispersion.

23 Claims, 16 Drawing Sheets

MULTI-PASS CONFIGURATIONS

CROSS REFERENCE TO RELATED APPLICATIONS

The present application claims priority to provisional application having Ser. No. 60/296,730 entitled "Multi-Pass Configurations" filed on Jun. 11, 2001 which is incorporated herein by reference.

MICROFICHE APPENDIX

Not Applicable

BACKGROUND OF THE INVENTION

The present invention relates to components for optical communications systems, specifically for interconnection and coupling devices utilizing multilayer optical interference filters.

Optical communications systems comprise an interconnected network of optical fibers for transmitting a plurality of the optical signal channels between nodes in the network. In order to increase the capacity of existing optical communications systems, or provide for flexible reconfiguration, multiple optical signal channels may propagate between nodes simultaneously using time division and wavelength division multiplexing (WDM). Wavelength division multiplexing refers to a plurality of signal channels characterized by a different wavelength of light, while time division multiplexing refers to a time sequence allocation of digital signals within a common optical signal channel. Although information may be transmitted in analog format in a WDM system, the digital format is commonly used in telecommunications because of the higher data transfer rates and compatibility with time division multiplexing schemes deployed in electronic communications systems.

As a WDM communication system utilizes optical signals of different wavelengths the optical fiber network must be configured such that the time sequential nature of information traveling on different wavelengths between common nodes is not temporally distorted. While such temporal distortion is influenced by design and environmental factors, it is frequently due to the wavelength dependence of the refractive index within the optical media forming the waveguiding optical fiber. The velocity of light is decreased on transmission through a dense media, such as optical glass fibers, in proportion to the refractive index ratio between free space transmission, 1, and the refractive index of the optical glass at the signal channel wavelength $n_g$. As a refractive index of glasses vary with wavelength, $\lambda$, (i.e. $n_g = n(\lambda)$) optical signals will be distorted, that is distributed in arrival time at the terminal node in the communication system network in proportion to the distance between originating node and the terminal node. The change in refractive index with wavelength is commonly referred to as chromatic dispersion. Thus, as the distance between nodes in the optical communication system increases, or the digital pulse width decreases in order to obtain greater signal transfer capacity, the inherent properties of optical glasses become a greater limitation on performance and reliability.

Chromatic dispersion of optical fiber is roughly constant over the 1550 nm communication window, and can be compensated by several techniques including dispersion compensating fiber, Fiber Bragg gratings, etc. However, certain wavelength filtering components such as multilayer interference filters (MLIF) can have significant dispersion characteristics due to a fundamental Kramers-Kronig type relationship between transmission spectrum and dispersion characteristics. This type of dispersion characteristic typically varies substantially over the narrow passband (that is the high transmission region corresponding to the allocation of signal channels at specific wavelength per ITU convention) of an MLIF having an etalon structure and therefore is difficult to compensate using conventional techniques such as dispersion compensating fiber.

Prior methods of correcting for chromatic dispersion include the use of optical fibers having a radial gradient in refractive index to provide self correction, known as dispersion compensated fiber. However, other sources of signal temporal distortion may arise for various active or passive components within the optical communication network, such as optical amplifiers, multiplexing filters, gain flattening filters, arrayed waveguides, Fiber Bragg gratings and the like, as well as temperature fluctuations. Accordingly, as an optical communication system is reconfigured for repair, maintenance or to meet changes in demand, the temporal distortion of signals may change in a manner that is not easily predictable. Accordingly, numerous methods providing for the effects of such chromatic dispersion, whether arising through the characteristics of the optical fiber or system components, have been developed. These methods include devices that either provide a fixed amount of compensation or an adjustable amount of compensation, and may be deployed at or between nodes in the optical communication system.

As new interconnections are required to insert such devices within the optical communication system it is desirable that the devices themselves, as well as the connections thereto, result in a minimum signal loss.

U.S. Pat. No. 5,557,468 in the name of Ip assigned to JDS Fitel Inc, of Nepean Canada issued Sep. 17, 1996 and shows a dual Gires-Tourneau (GT) etalon dispersion compensator. This '468 patent states that cascading two filters having the same reflectivity on the input/output mirrors has been suggested, but does not produce optimum results with respect to increasing the wavelength region over which the equalizer operates; The Ip patent illustrates that by cascading a first etalon with a second etalon having dissimilar reflectivity characteristics and being slightly offset in its center frequency response, it is possible to favorably extend the range of the output response. Although Ip's two etalons achieve their intended purpose of extending the operation wavelength range, it would be advantageous to have a device that provides a controllable constant amount of dispersion within a wavelength band of interest. That is, where tuning allowed different constant amounts of dispersion to be induced.

As the need for more complete correction of chromatic dispersion effects requires the use of multiple correction devices, the losses within such devices themselves, as well as interconnections to the optical fibers, have heretofore limited the degree of fixed or flexible, that is tunable, chromatic dispersion compensation that can be achieved.

Hence, it is an object of this invention to overcome some of the limitations of the prior art described above.

Accordingly, it is an object of the present invention to provide a device and method for optically coupling a plurality of MLIF in serial fashion with reduced signal loss for use within an optical communication system.

It is also an object of the present invention to compensate for the dispersion from WDM devices, including multiplexers, demultiplexers, and interleavers.

It is also an object to provide a device and method for optically coupling multiple dispersion compensating filters within an optical communication system with reduced signal loss.

It is a further object of the invention to provide devices and methods that permit tunable levels of chromatic dispersion correction over a broad range of wavelengths with reduced signal loss.

Accordingly, yet a further object of the inventive system is to provide chromatic dispersion correction devices having optical designs that provide for better tolerance alignment of optical components.

It is a further object of the invention to provide robust, reliable tunable chromatic dispersion compensation devices compatible with manufacturing in high-volume with a minimization of calibration alignment steps in order to reduce costs.

Furthermore, it is an object of the invention to provide devices that will compensate for the dispersion over a plurality of interspaced wavelength channels simultaneously.

It is another object of this invention to provide a dispersion compensator that will provide a certain amount of dispersion over a predetermined wavelength band.

It is another object of the invention to provide a dispersion compensator that will provide a tunable dispersion compensator that is at least tunable over a certain range of wavelengths.

SUMMARY OF THE INVENTION

As it has been recognized that the coupling losses arising from the use of the aforementioned multilayer optical filters may arise by an undesirable increase of the incident optical beam cross-section in at least one dimension which may be alternatively characterized as beam broadening, the first object is achieved by arranging optical filters, including etalon type filters, with other reflective elements such that the undesirable beam broadening, due to wavelength selective "walk off" is self-correcting and that the return optical path to the output port of such devices is substantially symmetric to the input optical path that results in beam broadening.

In the present invention, yet another objective is achieved by utilizing etalon filters that fully reflect all of the incident light over the wavelength range of interest corresponding to the optical signal channels utilized, in combination with other reflective elements to provide a desirable level of chromatic dispersion compensation.

In accordance with another aspect of the invention a method for compensating dispersion in an optical signal is provided, comprising the steps of: providing a first optical filter having a single-sloped or monotonically sloped dispersion output response within at least a predetermined wavelength band; providing a second optical filter having a single-sloped or monotonically sloped dispersion output response within at least a predetermined wavelength band, wherein the first and second filters have slopes of opposite sign; tuning one of the first and second filters in a controllable manner to vary the amount of dispersion induced by the filter within the predetermined wavelength band with minimal signal loss over the tuning range.

In yet another aspect of the invention the device includes either multiple etalon filters to provide for either self-correction of the aforementioned beam-broadening phenomenon or to achieve a greater level of dispersion compensation with minimal signal loss over the tuning range.

In yet another aspect of the invention the device includes reflective elements configured so as to redirect the optical beam towards one or more etalon filters more than once so as to provide either or both self correction of the aforementioned beam broadening phenomenon or to achieve a greater level of dispersion compensation.

Further, it is another aspect of the invention to include arrangements of the aforesaid reflective elements and/or etalons such that the dispersion compensation can be dynamically tuned.

In yet a further aspect of the invention the etalon structures are arranged to include means for compensating the aforementioned beam-broadening phenomenon as it arises from the dynamic tuning of the dispersion compensation.

In yet a further aspect of the invention, the tunable dispersion compensation is achieved by tilting the etalon filters with respect to the incident optical beam in order to provide increased and adjustable levels of dispersion compensation. Accordingly, other embodiments of the present invention include elements and methods of compensating for the increased beam broadening that arises from tilting the etalon filters.

In accordance with the invention there is provided an apparatus for multipassing all-pass filters comprising a lens for collimating a beam of light; an all-pass filter; and compensation means for canceling a walk-off.

Advantageously, the apparatus in accordance with the invention has a low loss and is independent to differences in a wavelength dependent optical path.

In accordance with a further embodiment of the present invention the compensation means for canceling the walk-off is another all-pass filter so that the beam of light propagates along the same path in a reverse direction.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 15b is a graph of dispersion versus wavelength for the filter referenced in FIG. 15a;

FIG. 15c is a graph of dispersion versus wavelength as a desired output response for dispersion related to the filter of FIG. 15a.

DETAILED DESCRIPTION OF THE PREFERRED EMBODIMENT

Figure 1:
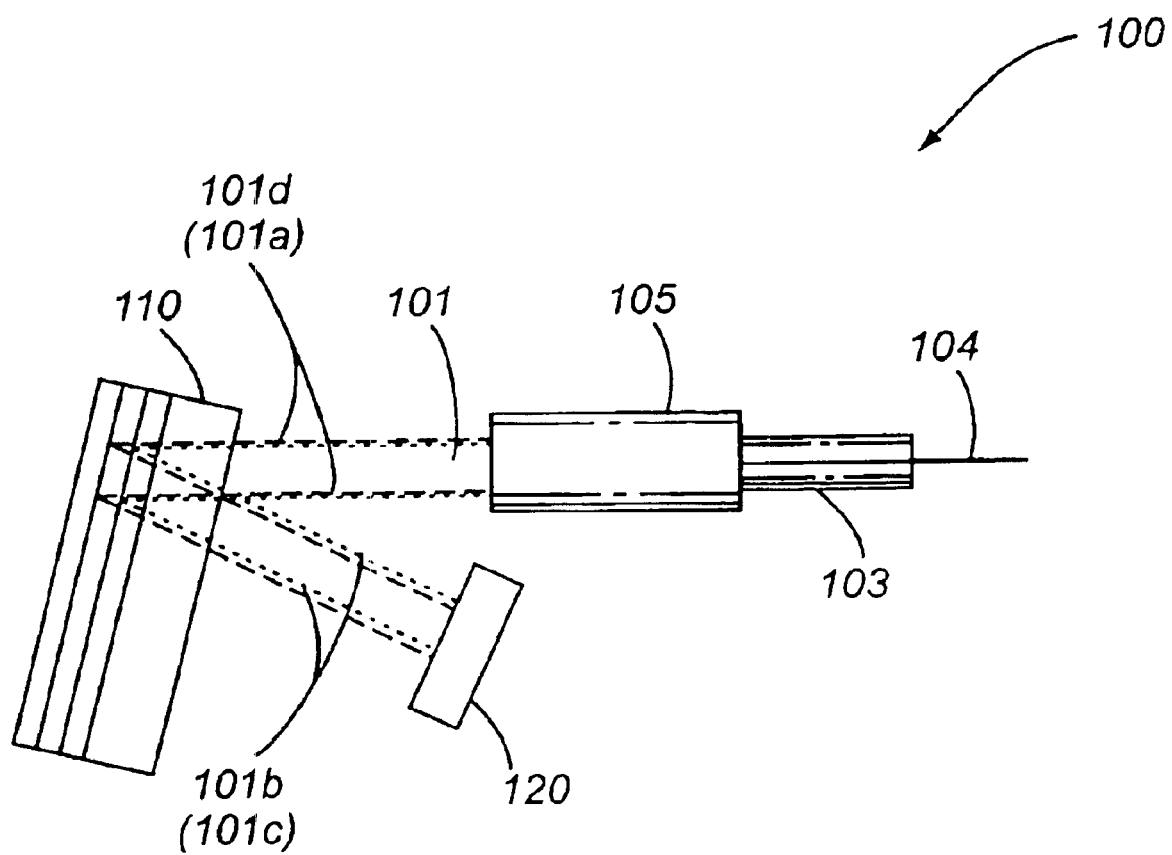
FIG. 1 is a plan view of an optical device schematically illustrating the function of the components using a ray diagram. The device is characterized as a 2:1:1 device in that two reflections occur off a multilayer interference filter to convey a collimated optical beam between a single port and direction.

In accordance with the present invention FIG. 1 illustrates one working principle utilizing a ray diagram of an optical device 100 having a generic multilayer interference filter (MLIF) 110. The principles of operation are further extended in additional embodiments, adding to specific functionality and performance as discussed below. A collimated light beam 101, such as that optionally arriving from an optical fiber 104 via a collimating lens 105 (for example a gradient index (GRIN) lens) is incident upon an MLIF 110. In the preferred embodiments, the MLIF 110 is an etalon structure designed to provide a wavelength dependent group delay without beam attenuation. The design and application of such filters is described, infra, with respect to additional embodiments of the invention.

In summary, the MLIF comprises alternating layers of the high and low refractive index dielectric materials that provide for wavelength selective reflection or transmission of light via interference of the optical beam that is partially reflected at the interface between the layers. The thickness of these layers is generally selected to have an optical path length of a quarter wavelength, but the thickness and order of the layers may be varied to phase as well as intensity modulation that is wavelength dependent.

Of substantial interest for optical communication systems are MLIF that have an etalon structure in which at least one optical cavity is surrounded by what are denominated as reflector layers. The reflector layers are generally themselves MLIF that are partially reflective and partially transmissive. The optical cavity may comprise the same or different materials used to form the surrounding reflector layers. Additionally, the etalon structures may comprise multiple cavities of different materials and/or thickness depending on a desired optical performance, which may include selective attenuation at particular wavelengths as well as a wavelength dependent group delay.

As the number and thickness of layers in a MLIF, or optical cavities in an etalon structure, increases, the interaction of incident light becomes increasingly dependent on the angle of incidence with the MLIF surface. Although this phenomenon is frequently exploited in various ways it introduces a significant complication in optical communication where the increase in coupling loss of optical signals at interconnection points must be avoided. Signal loss, measured in fractions of a dB, arise when the optical beam exits an input optical fiber to propagate in free space towards a MLIF if the reflected or transmitted beam is not fully collected and coupled back into the output fiber. It has come to be appreciated that a collimated polychromatic optical beam is reformed from a substantially circular collimated beam to an elliptical collimated beam on reflection from such MLIFs. An aspect of the invention is a range of coupling devices wherein the beam broadening effects of the MLIF are eliminated independent of the MLIF and the angle of incidence of the optical beam at the MLIF surface. This aspect is particularly significant with respect to etalon structures designed to provide chromatic dispersion correction, as the beam broadening can be substantial, and otherwise compromise performance or aspects of device design and functionality.

As set forth in FIG. 1, collimated optical beam 101 is first incident on MLIF 110 as optical beam segment 101a at oblique rather than normal incidence. Accordingly, optical beam segment 101b increases in cross-sectional dimension in the major axis of the ellipse in the plane defined by the incident beam 101a and reflected beam 101b, upon reflection from MLIF 110. Those wavelengths that undergo either more or deeper reflections before emerging from the surface of MLIF 110 process or "walk" down the filter resulting in an even broader beam diameter in the major axis of the ellipse as the angle of incidence increases to a more oblique angle. In FIG. 1 above, the edge of the beam, representing ray segment of wavelengths undergoing the most "walk-off", is illustrated by the dashed line. Throughout this application, the reference to broadening of the beam diameter is understood to refer to the increased major diameter of the elliptical beam.

Optical beam segment 101b is then normally incident at a reflective element 120, which is optionally a metallic reflector, a MLIF type reflective mirror, or a prism having a total internal reflection surface and the like. As discussed further in additional embodiments, reflective element 120 can also be a second MLIF, including an etalon structure having the same or different optical performance characteristics as MLIF 110. In other embodiments, the reflective element is a combination of 2 or more reflective surfaces for reversing the beam direction with a lateral offset such that it is parallel to the incident beam, such as a right angle prism, corner cube, multiple single sided mirrors, and the like.

However, it should be noted that reflective element 120 is oriented with respect to MLIF 110 so that collimated optical beam segment 101b arrives at normal incidence such that it is reflected back towards the etalon 110 as optical beam segment 101c without further increase in beam diameter from reflective element 120. Optical beam segment 101c is reflected back toward MLIF 110, such that it is again reflected by MLIF 110 propagating in the opposite direction but parallel to the original incident collimated beam segment 101a. As the reversed path of optical beam segment 101c provides for a second interaction, or pass, at MLIF 110 rays of optical beam segment 101c having wavelengths that were laterally displaced by "walk off" on the first pass at MLIF 110 are now displaced by the same walk off phenomenon in the opposite direction such that reflected collimated optical beam segment 101d is now decreased in diameter to substantially the same diameter as optical beam segment 101a original diameter on reflection from etalon 110, propagating parallel to but in the opposite direction as the incident optical beam. Therefore, collimating lens 105 will collect substantially the entire signal in optical beam segment 101c for efficient coupling back into the incoming optical fiber 104.

Figure 2:
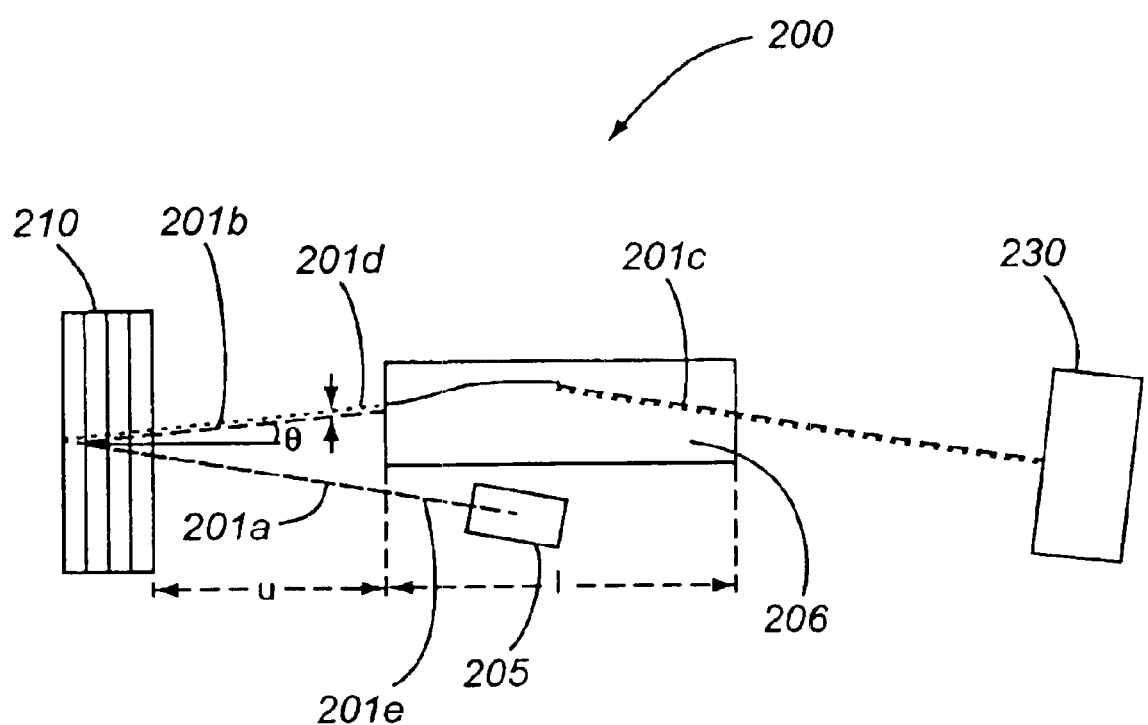
FIG. 2 is a plan view of an alternative 2:1:1 optical device schematically illustrating the function of the components using a ray diagram.

In another embodiment 200 illustrated in FIG. 2, the input optical beam 201a is likewise broadened by a MLIF, such as an etalon structure, 210, after reflection as optical beam segment 201b but is now incident upon a lens element 206, such that it is emerging as optical beam segment 201c. A reflective element 230 is disposed behind lens element 206 such that the optical beam segment 201c is reflected as optical beam segment 201d. Optical beam segment 201d propagates in the reverse path of optical beam segments 201c and 201b, and is reflected as optical beam segment 201e on returning towards the incident collimated beam 201a, shown originating at collimating lens 205. Lens element 206 is preferably a half pitch GRIN lens, and is provided for inverting the beam of light so that the walk-off is cancelled upon a second pass through the etalon structure. The etalon structures are preferably all-pass filters, infra. In this configuration reflective element 230 is oriented with respect to lens element 206 such that the optical beam segment 201c arrives at normal incidence.

Figure 3:
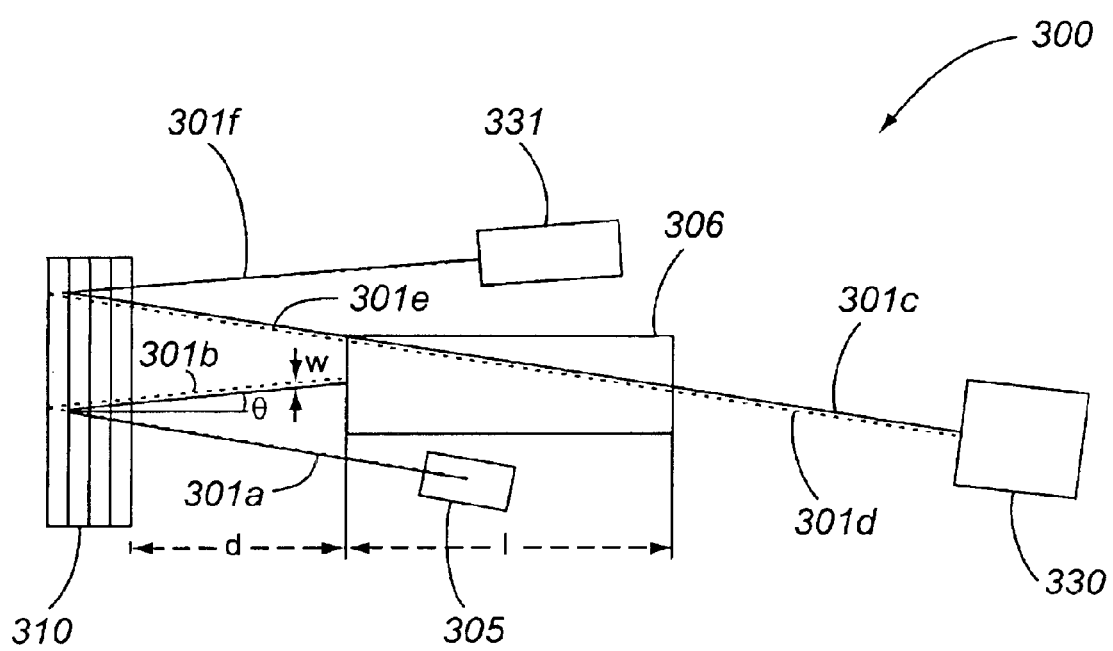
FIG. 3 is a plan view of a 2:1:2 optical routing device schematically illustrating the function of the components using a ray diagram. The device is characterized as a 2:1:2 device in that 2 reflections occur off of the multilayer interference filter to convey a collimated optical beam between a separate input port and output port.

FIG. 3 illustrates another embodiment wherein optical beam segments 301a, b, c follow the same path as illustrated in FIG. 2. However, reflective element 330 is a right angle prism for diverting optical beam segment 301c out of the plane of the paper as optical beam segment 301d and then back parallel to the plane of the paper as optical beam segment 301e. Optical beam segment 301e propagates in a second level of device 300 above lens 306 such that it arrives at MLIF 310, which traverses the first and second level of device 300, for a second pass at the same angle of incidence as optical beam segment 301a. Optical beam segment 301e is at least partially reflected off MLIF 310 as optical beam segment 301f having substantially the same cross-sectional dimensions as optical beam segment 301a. Optical beam segment 301f is then incident upon another lens 331 for coupling to an output optical fiber (not shown).

As the aforementioned embodiments of the invention can be combined in numerous configurations to provide additional functionality, the following 3-digit nomenclature will be used to distinguish between the additional embodiments. Thus an X:Y:Z type device refers to a configuration of optical elements to provide X multiple reflections off Y MLIFs resulting in a collimated optical beam that either 1) returns parallel and overlapping the incident collimated beam so that it can be coupled into the same optical fiber that provided the incident collimated beam, that is a single port device (Z=1) or 2) redirected to a second optical port for retransmission (Z=2). Any of the optical devices having a single port for input and output can be converted to two port device by replacing the reflective element with another element or combination of two or more reflective surfaces to reverse the beam direction with a lateral offset such that it is parallel to the incident beam, these alternative elements are exemplified by a right angle prism, corner cube, multiple single sided mirrors, and the like. As the scope of the claimed invention is intended to include embodiments wherein the number of reflections off each MLIF is not equal, the x and y factors will be enclosed in separate parentheses for each of the MLIFs with a different number of reflections.

Whereas various MLIF designs for providing dispersion or group delay compensation have been disclosed in U.S. Pat. Nos. 5,734,503; 6,301,049; 6,301,042; 6,222,673; 6,154,318 and 6,081,379, which are incorporated herein by reference, the inventive method of correcting for beam broadening in the previously described embodiments enables the practical use of multiple etalon structures to provide a range of solutions for correcting for group delay in optical communication systems. Such preferred etalon structures are frequently referred to as all-pass filters, in that they have at least one almost totally reflective layer for fully reflecting selected wavelengths or wavelength ranges that are not reflected by other reflective layers in the MLIF, thus providing a predetermined amount of dispersion without signal attenuation. Accordingly, the function, design and performance characteristics for the preferred etalon structures application to these embodiments are now described in further detail.

Figure 15A:
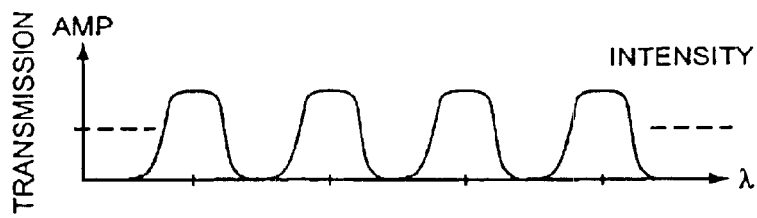
FIG. 15a is a graph of amplitude versus wavelength of output response of a typical WDM filter device.
Figure 15B:
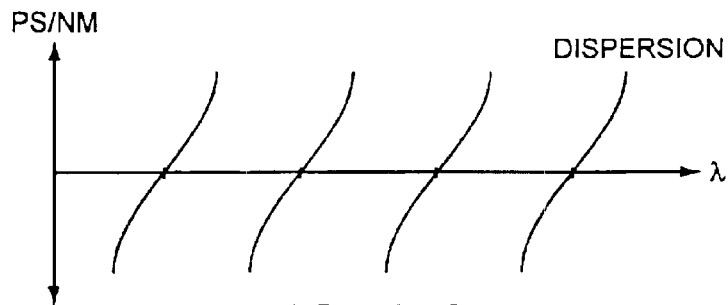
Figure 15C:
Figure 15D:
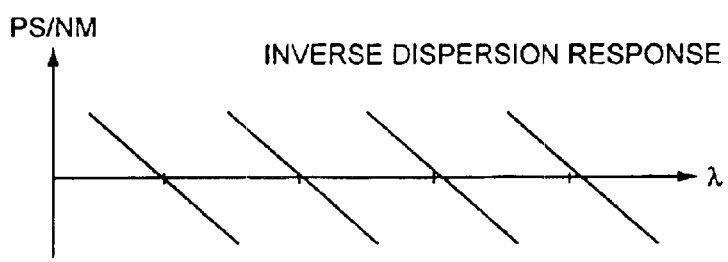
FIG. 15d is a graph of dispersion versus wavelength of an output response of the dispersion compensator in accordance with this invention.
Figure 15E:
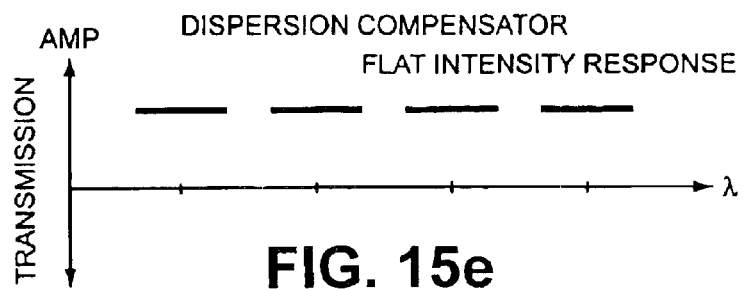
FIG. 15e is a graph of amplitude versus wavelength of an output response of a dispersion compensator in accordance with this invention.

FIGS. 15a to 15e illustrates the desirable wavelength dependent characteristics of an etalon structure that corrects for chromatic dispersion in a WDM device deployed in an optical communication system. FIG. 15a shows the periodic amplitude response of a WDM device (an interleaver in this case) plotted against wavelength. The group delay in picoseconds per nm, will vary with the same periodicity, as shown in FIG. 15b. The periodic response of an etalon structure is advantageous when multiple wavelengths periodically spaced must be compensated, as in this example. As the ideal output response after dispersion compensation is flat, as in FIG. 15c, the etalon structure(s) in the compensating device preferably has an inverse periodic dispersion response, shown in FIG. 15d, which will substantially cancel the group delay response of FIG. 15b. FIG. 15e illustrates the desired output response of intensity versus wavelength for the etalon dispersion compensator structure.

Additionally, it is preferable that the compensating device does not attenuate the optical signals, and the devices composite transmission function, shown in FIG. 15e, is as close as possible to 100% at the optical signal channel peaks shown in FIG. 15a.

Figure 16:
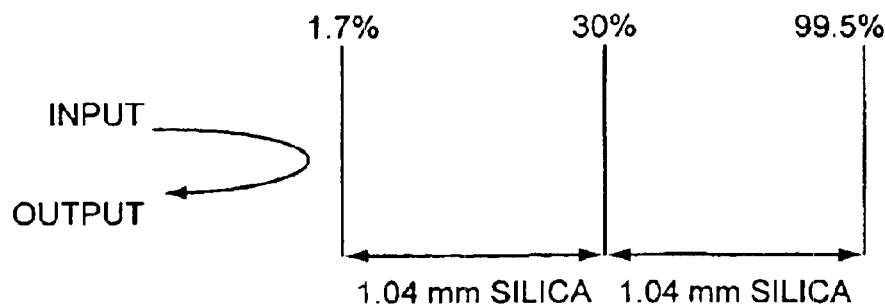
FIG. 16 illustrates a two cavity etalon structure for providing a dispersion compensator having a free spectral range (FSR) of 100 GHz designed to compensate a signal with channels of width 0.2 nm separated by 100 GHz (about 0.8 nm).

In order to avoid signal attenuation the preferred etalon structure is fully reflective of the incident optical beams by having a last dielectric layer that is as close as possible to 100% reflective. FIG. 16 illustrates a two cavity etalon structure for providing a dispersion compensator having a free spectral range (FSR) of 100 GHz designed to compensate a signal with channels of width of 0.2 nm separated by 100 GHz (about 0.8 nm). The FSR of the etalon is usually matched to the channel width/spacing by properly selecting the cavity spacing, according to the formula:

$$d = c/(2*n*FSR)$$

Where d is the cavity spacing, c is the speed of light, n is the group refractive index of the material forming the etalon cavity, and FSR is the free spectral range of the etalon, expressed in frequency units.

The structure in FIG. 16 is similar to the Gires-Tournois interferometer described in a paper entitled 'Low-loss dispersion equalizer operable over the entire erbium window', D. Garthe, J. Ip, P. Colbourne, R. E. Epworth, W. S. Lee and A Hadjifotiou, Electronics Letters vol. 32, no. 4, 15$^{th}$ Feb. 1996, pp. 371–372, but with a multi-cavity structure to modify the dispersion characteristics as required. The multicavity structure permits a flat spectral response across the wavelength range corresponding to the optical signal channels.

In FIG. 16, the etalon structure is shown to have a first reflective surface having a reflectivity R1, a second reflective surface having a reflectivity R2, and a third reflective surface having a reflectivity R3. R1 has a reflectivity that is essentially 100% reflective. R2 and R3 have reflectivities of greater than 0 and less than 100%. The two gaps between the three surfaces have a thickness of d1 and d2 which are equal or integer multiples of one another so as to give a periodic response. In embodiments directed to certain applications special attention must be paid to obtain precisely equal spacing between the mirror surfaces of the multi-cavity device, since the spacing must be equal within a small fraction of a wavelength. This can be achieved by, for example, polishing both mirror spacers at the same time, and joining the parts by optical contacting techniques; in this case the mirror coatings should be designed such that the reflection phases of the coatings are equal. Alternatively, the device may be actively aligned during assembly to obtain the correct spacing between the mirrors.

Figure 17:
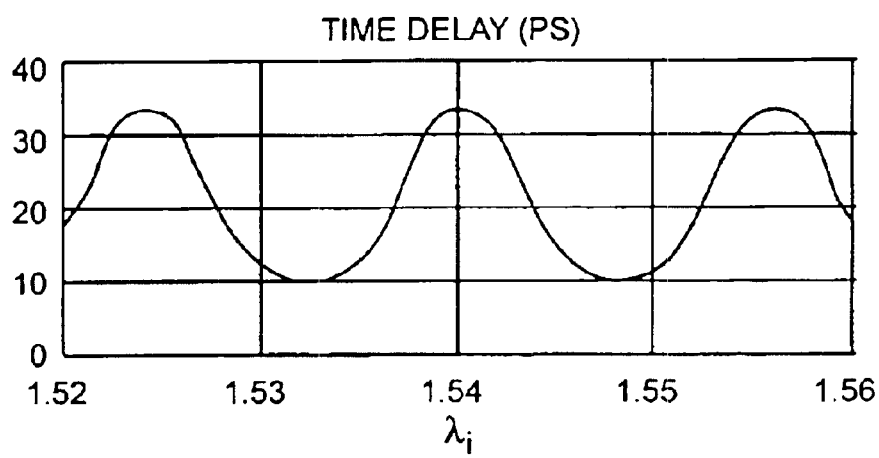
FIG. 17 is a plot of time delay versus wavelength for the dispersion compensator device in FIG. 16.
Figure 18:
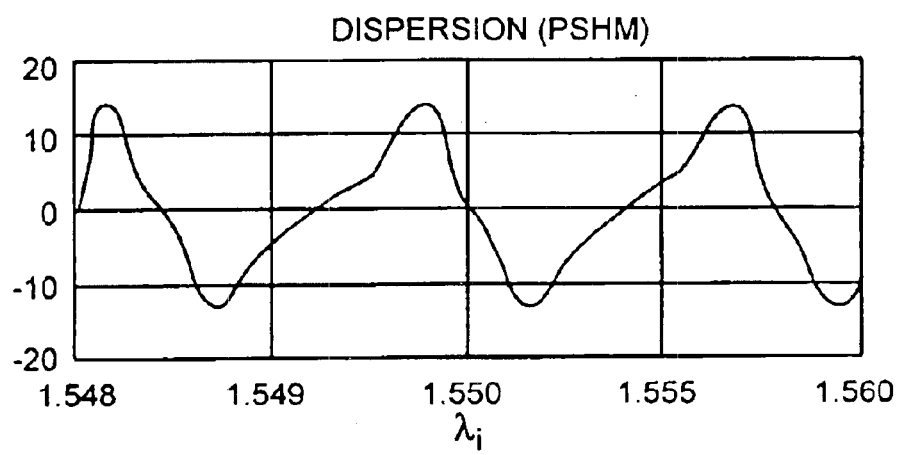
FIG. 18 is a graph which illustrates dispersion and its periodic nature for the dispersion compensator device in FIG. 16.

Turning now to FIG. 17, a plot is shown of a dual cavity etalon structure of the device in FIG. 16 for dispersion compensation. The device has a first optical cavity and second optical cavity. The cavities are made of two blocks of silica providing a predetermined gap of 1.04 mm between reflective end faces. The device has a front input/output face having a reflectivity of 1.7%, an outward oppositely facing end face that is substantially totally reflective having a reflectivity of 99.5% and a second face having a reflectivity of 30% disposed between the front and outward facing end faces. The periodic nature of time delay versus wavelength is shown in FIG. 17. FIG. 18 illustrates dispersion of the device of FIG. 16, wherein the periodic nature of the dispersion is evident from the plot. By providing a dual cavity device a flatter top results in the time delay curve shown providing a closer fit to the delay characteristics of a typical device requiring compensation.

Etalon structures to be deployed in various combinations to modify the magnitude and wavelength dependence of the dispersion correction according to other embodiments of the invention will now be described in conjunction with FIGS. 19, 20a and 20b, 21a through 21c.

Figure 19:
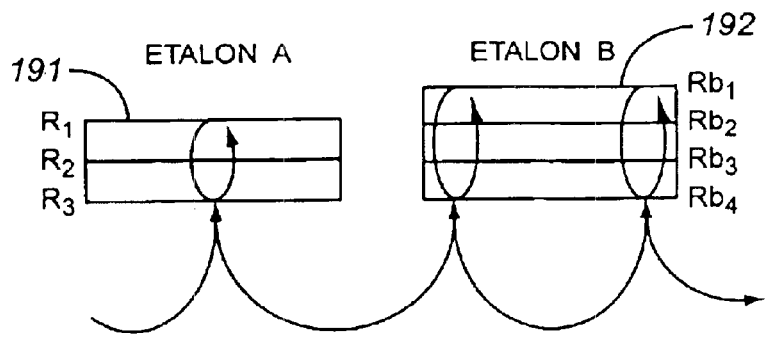
FIG. 19 is a schematic diagram of a dispersion compensator in accordance with the invention having a first etalon having a first output response optically coupled with a second etalon having a different output response wherein the slope is opposite in sign from that of the first etalon.
Figure 20A:
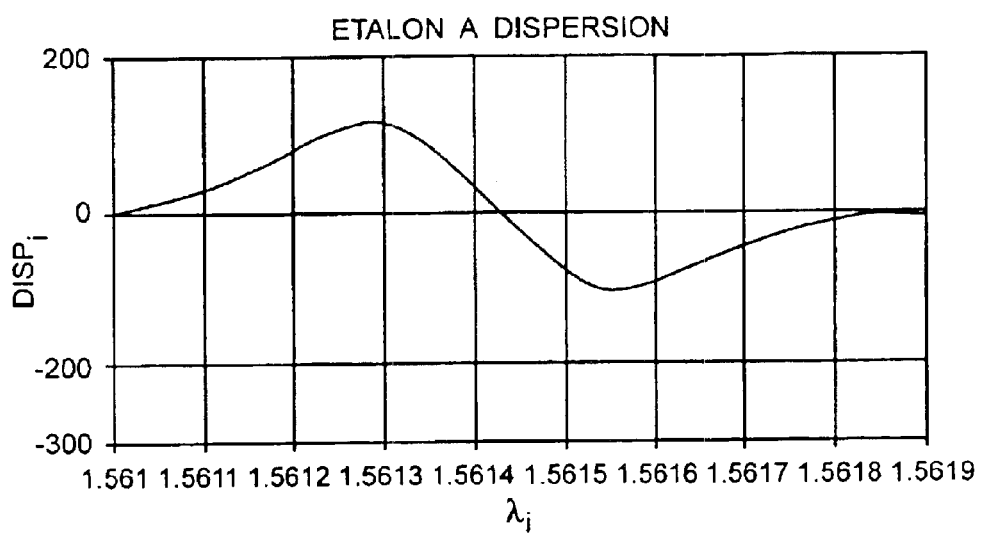
FIG. 20a is a graph of an output response of a dispersion versus wavelength for the first etalon structure shown in FIG. 19.
Figure 20B:
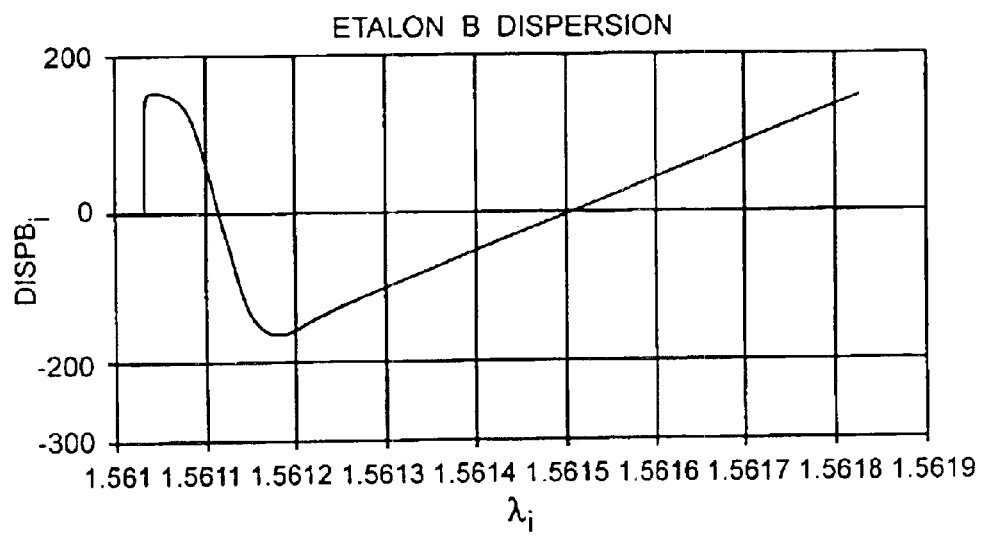
FIG. 20b is a graph of an output response of dispersion versus wavelength for the second etalon structure shown in FIG. 19.

Referring now to FIG. 19 two etalons structures 191 and 192 are shown schematically as being optically coupled to one another. The first etalon (A) 191 is a multi-cavity etalon and the second etalon (B) 192 is a multi-cavity etalon having a greater number of cavities than 191. The etalons are coupled such that a beam launched into first etalon 191 propagates within the etalon and after being reflected out of the first etalon 191 enters the second etalon 192. The beam exiting 192 is then relaunched into second etalon 192 a second time. The graphs of FIGS. 20a and 20b show output response curves for dispersion plotted as a function of wavelength for the etalons 191 and 192 respectively. The etalon of FIG. 20a is a two-cavity design with mirror reflectivities 0.85%, 24%, and 99.8%, and the etalon of FIG. 20b is a 3-cavity design with mirror reflectivity's 0.04%, 2.3%, 38%, and 99.8%. In both cases, all the etalon spacer layers are equal. What is noted in FIG. 20a is that the slope of the dispersion curve between the wavelengths of interest where compensation is required, i.e. 1.5613 μm and 1.5615 μm, is negative and decreasing. Conversely, in FIG. 20b between the same wavelength ranges, the slope is positive and increasing. The slope shown in the figures of the dispersion wavelength curve is for a single pass; however the combined response is twice that shown. If the filters 201 and 202 are selected to produce dispersion response curves that are opposite in sign and have substantially the same magnitude irrespective of sign, i.e. same absolute value at any given wavelength within a range of wavelengths of operation, the combined dispersion output response will be a flat dispersion curve having a substantially zero slope. If one of the etalons produces more dispersion than the other, wherein the dispersion is opposite in sign, the total dispersion from the device comprising the two etalons structures will be monotonically increasing or decreasing.

Figure 21A:
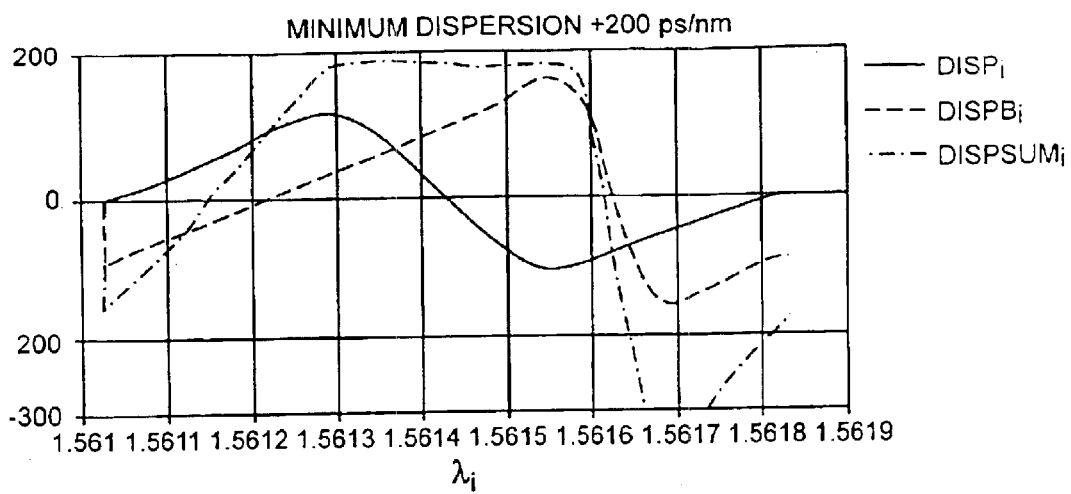
FIGS. 21a through 21c are graphs illustrating the dispersion of the first etalon structure, the second etalon structure and the combined output of the system of etalons after double passing through the second etalon structure of FIG. 19 with various levels of control applied.
Figure 21B:
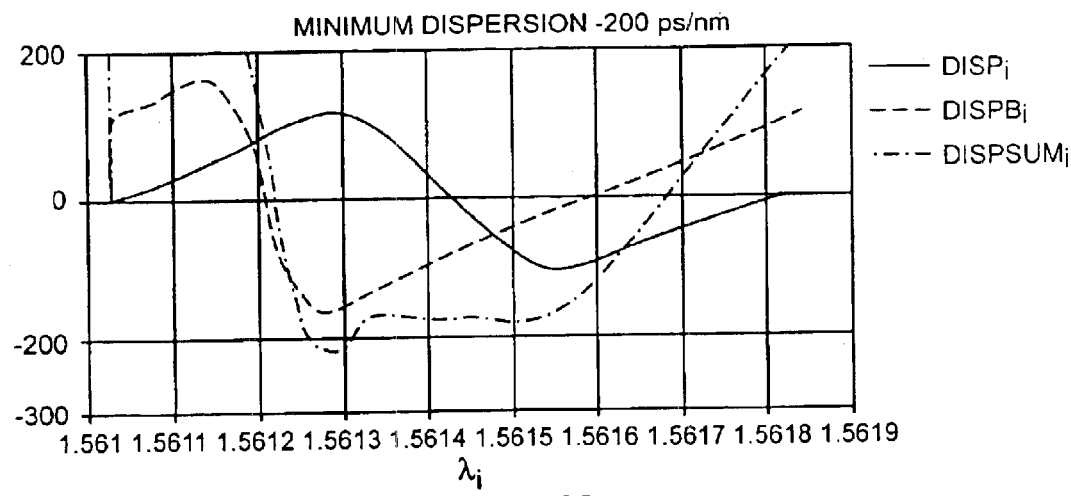
Figure 21C:
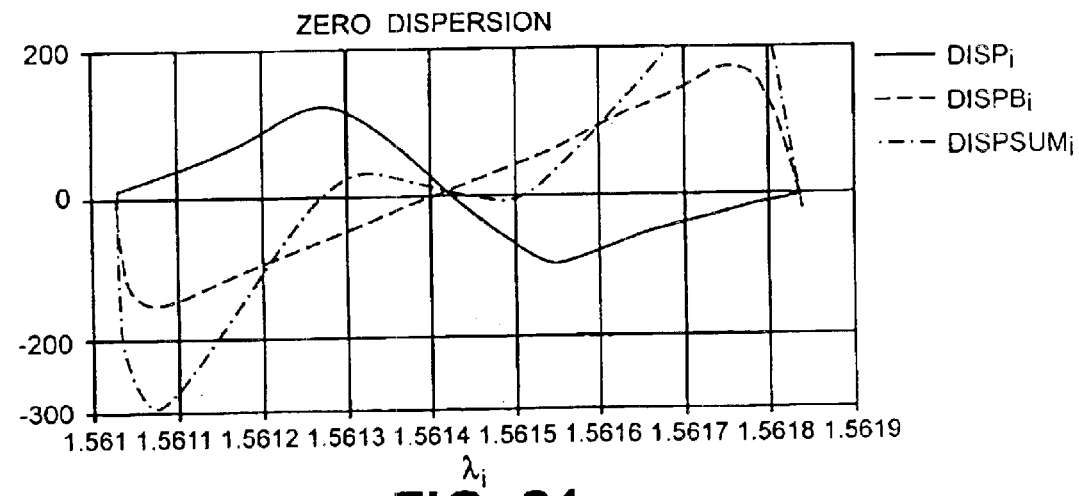

FIGS. 21a through 21c each show three curves wherein the dashed curve indicates the combined response of the other two solid and dotted curves representing output responses of two cascaded dispersion-compensating filters, such as the one's shown in FIG. 19. By slightly varying the FSR of one or both of the etalons, its output response can be shifted slightly in wavelength, effectively having the result of relatively moving the dispersion response curves toward or away from each other. This is in effect tuning to provide different amounts of dispersion. As long as the opposite dispersion slopes have an equal magnitude over a range of wavelengths of interest the response will be flat. Since the dispersion is additive between the two responses, the total amount of dispersion at a given wavelength is the sum of the two dispersions induced by the two filters 191 and 192. In FIG. 21a the maximum dispersion is obtained by tuning the etalons and aligning the output responses as shown to obtain a relatively constant dispersion of +200 ps/nm across a wavelength band of interest. In FIG. 21b, a minimum dispersion of −200 ps/nm is obtained across the same wavelength band of interest. In the embodiment shown, the etalon 192 is temperature tuned and its dispersion output response (curve) is shifted relative to the dispersion output response of the etalon 191. This results in a variable substantially flat dispersion of +/−200 ps/nm that is controllable over a predetermined wavelength band. However, etalons of a suitable design must be coupled to one another to obtain a desired output response. Preferably, the FSR of the etalon structures is matched to the ITU grid spacing so that all channels between 192 THz to 196 THz are subjected to the same controllably variable dispersion.

In another embodiment of the invention the etalons 191 and 192 can be provided with a mismatch in FSR thereby providing a device with a dispersion response, which varies from channel to channel. For example the dispersion can be varied from 95 ps/nm at 196 THz to −95 ps/nm at 192 THz. This would compensate for the remaining dispersion slope of 150 km of SMF28 optical fiber after dispersion compensation by conventional dispersion compensating fiber.

Although the preferred embodiment utilizes multicavity etalon structures the various multipass arrangements disclosed herein enable a plurality of single cavity etalon structures to be utilized wherein each etalon has a first and second dielectric reflector stack of a predetermined level of reflectivity to achieve the desired wavelength dependent group delay.

Figure 4:
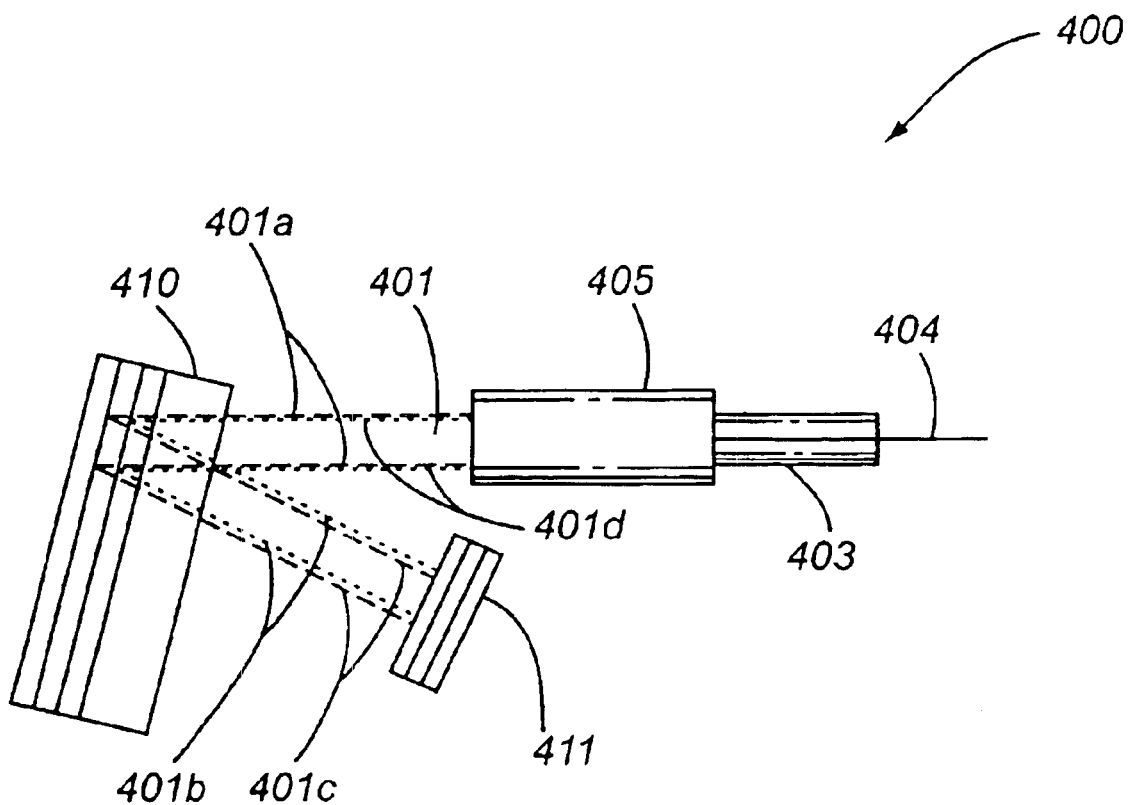
FIG. 4 is a plan view of an alternative optical device schematically illustrating the function of the components using a ray diagram. The device has two multilayer interference filters but may be characterized as a (2:1)(1:1):1 device in that 2 reflections occur off of one of the two multilayer interference filters to convey a collimated optical beam between a single port or direction. One reflection occurs off the second multilayer interference filter.

Another embodiment 400 of the invention is illustrated in FIG. 4 and includes an optical fiber 404 encased in a ferrule 403, which is coupled to a lens 405. This embodiment may be characterized as a (2:1)(1:1):1 device, as a second MLIF filter 411 replaces mirror 120 in FIG. 1, and is organized with respect to a first MLIF 410 such that optical beam segment 401b arrives at normal incidence. Accordingly the reversal of optical beam segment 401c results in a reduction in beam cross sectional dimension after the second reflection off first MLIF 411 such that the optical beam segment 401d has substantially the same cross sectional dimensions as optical beam segment 401a. This configuration allows for wavelength and non-wavelength dependent modification or selective routing of optical signal channels contained in optical beam 401, including chromatic dispersion compensation for group delay when first multilayer optical interference filter 410 is an etalon structure, as well as the combined filtering effects of both optical filters 410 and 411; all without significant coupling loss arising from the beam broadening effects of optical filter 410. Further, both MLIF 410 and 411 are optionally etalon structures that can provide selective or variable dispersion compensation as described with respect to other embodiments of the invention, supra.

Accordingly, it will be recognized by those skilled in the art of optical system design that the undesirable beam broadenings effects of any multilayer optical interference structure may be corrected by substituting such a filter for the etalon structures recited in the illustrative embodiments that follow.

Figure 5A:
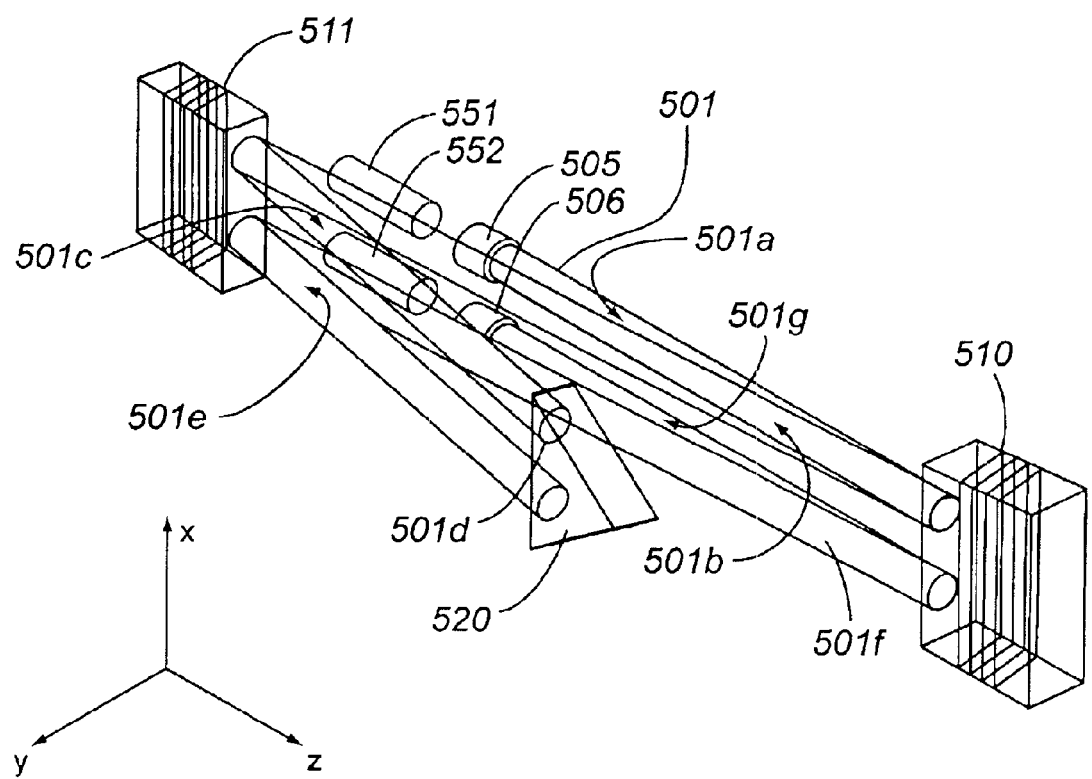
FIGS. 5$a$, $b$ and $c$ are isometric and plan views of the x-z and y-z planes of a 2:2:2 optical routing device respectively, schematically illustrating the function of the various components.
Figure 5B:
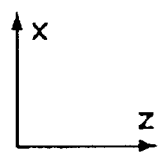
Figure 5B:
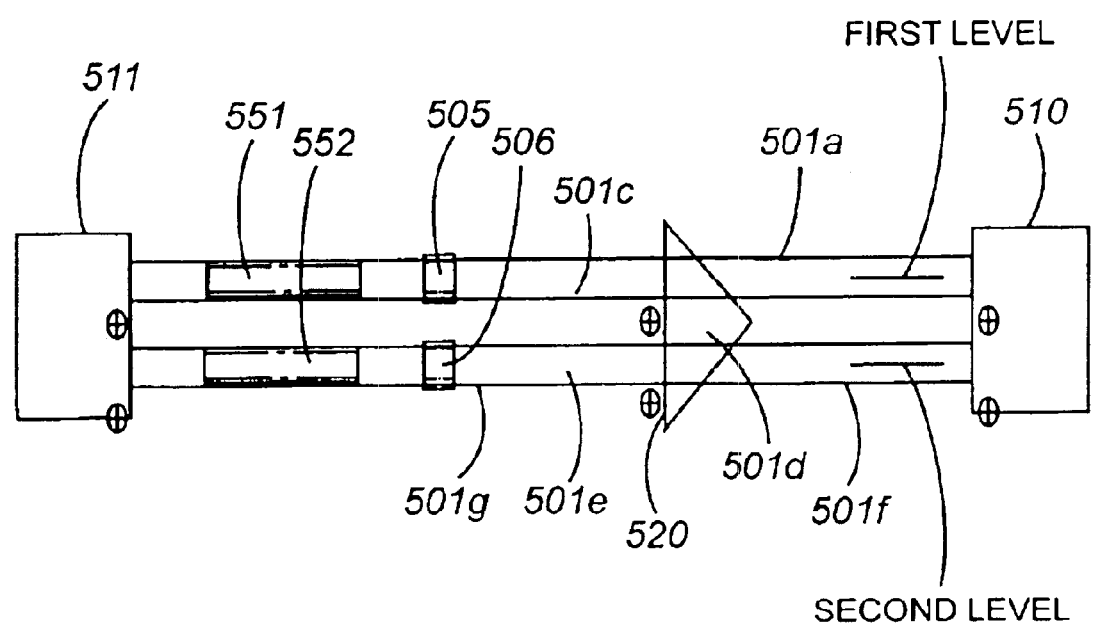
Figure 5C:
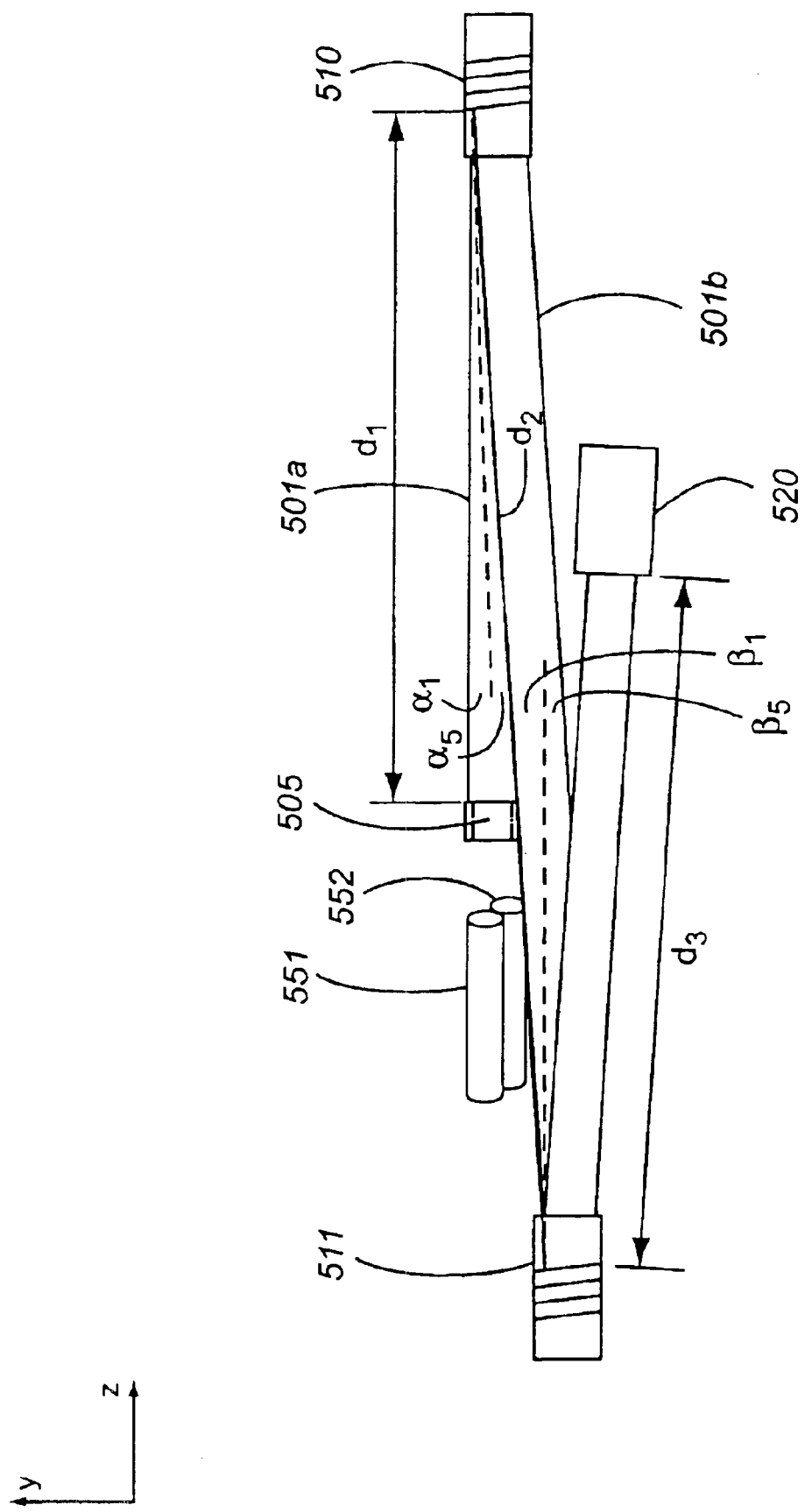

FIGS. 5a, b and c illustrate an additional embodiment of the invention as a 2:2:2 optical compensation device. FIG. 5a is an isometric view while FIGS. 5b and 5c illustrate sections of the x-z and y-z planes, respectively, showing first etalon structure 510, second etalon structure 511. The device has 2 layers in which optical beam segment 501 is twice reflected off of both etalons structures. The ray paths in each level are illustrated in FIG. 5c in which light rays emanating from an optical fiber (not shown) held in first fiber tube 551 are collected by first aspheric lens 505, which forms collimated optical beam 501. Segment 501a of the optical beam 501 arrives at the first etalon structure 510 at oblique incidence and is in turn reflected toward the second etalon structure 511 as optical beam segment 501b. Optical beam segment 501b arrives at etalon structure 511 at oblique incidence and is reflected toward right angle prism 520 as optical beam segment 501c. Turning now to FIG. 5b right angle prism 520 receives optical beam segment 501c propagating in the first level of the device and directs it towards second etalon structure 511 in the second level of the device as optical beam segment 501e, after two internal reflections within right angle prism 520, at the facets represent intersected by the terminus of optical beam segment 501d. Optical beam segment 501e is then reflected off the second etalon structure 511 at an oblique angle returning for a second reflection off etalon structure 510 as optical beam segment 501f. Optical beam segment 501f arrives at etalon structure 510 at oblique incidence and is then reflected as optical beam segment 501g toward second aspheric lens 506, where it is collected and coupled into the optical fiber (not shown) secured by the second fiber tube 552.

Figure 6:
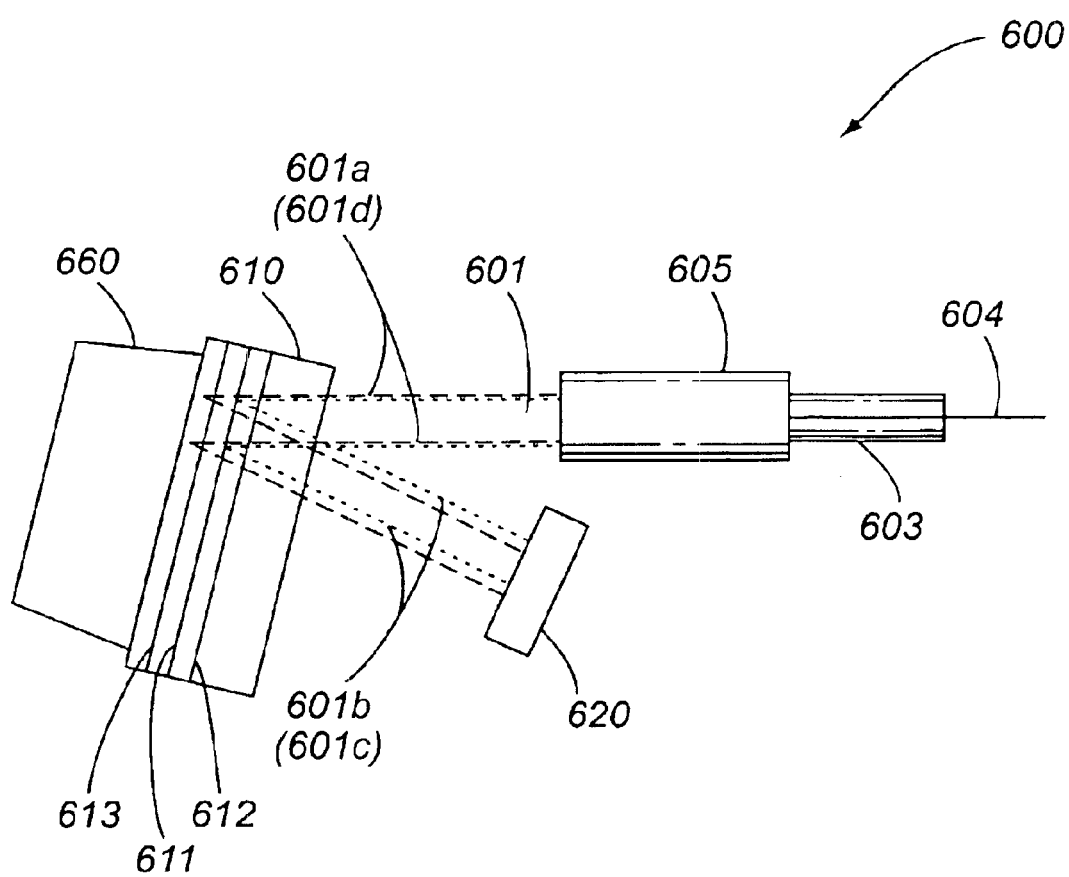
FIG. 6 is a plan view of a thermally tunable 2:1:1 optical routing device schematically illustrating the function of the components using a ray diagram.

FIG. 6 illustrates yet another embodiment 600 of the invention wherein the MLIF 610 may be modified by a thermal, mechanical, electrical or magnetic stimulus applied by actuator 660 that changes the optical path length of one or more of the illustrated layers 611,612 or 613 in optical filter 610, by either changing the physical dimensions or optical properties of one or more of these layers. Such modification permits tuning of the optical transfer characteristics of the filter, further details of which are described in, inter alia, U.S. Pat. Nos. 6,285,504 and 5,841,918, which are incorporated herein by reference. As above, an optical beam 601 is launched via an optical fiber 604, which is encased in a ferrule 603, coupled to lens 605. Light segment 601a is reflected off of the MLIF 610 forming light segment 601b, which is reflected back by a mirror 620 as light segment 601c. Light segment 601c reflects off of the MLIF 610 as light segment 601d for focusing onto the optical fiber 604 via the lens 605.

Figure 7:
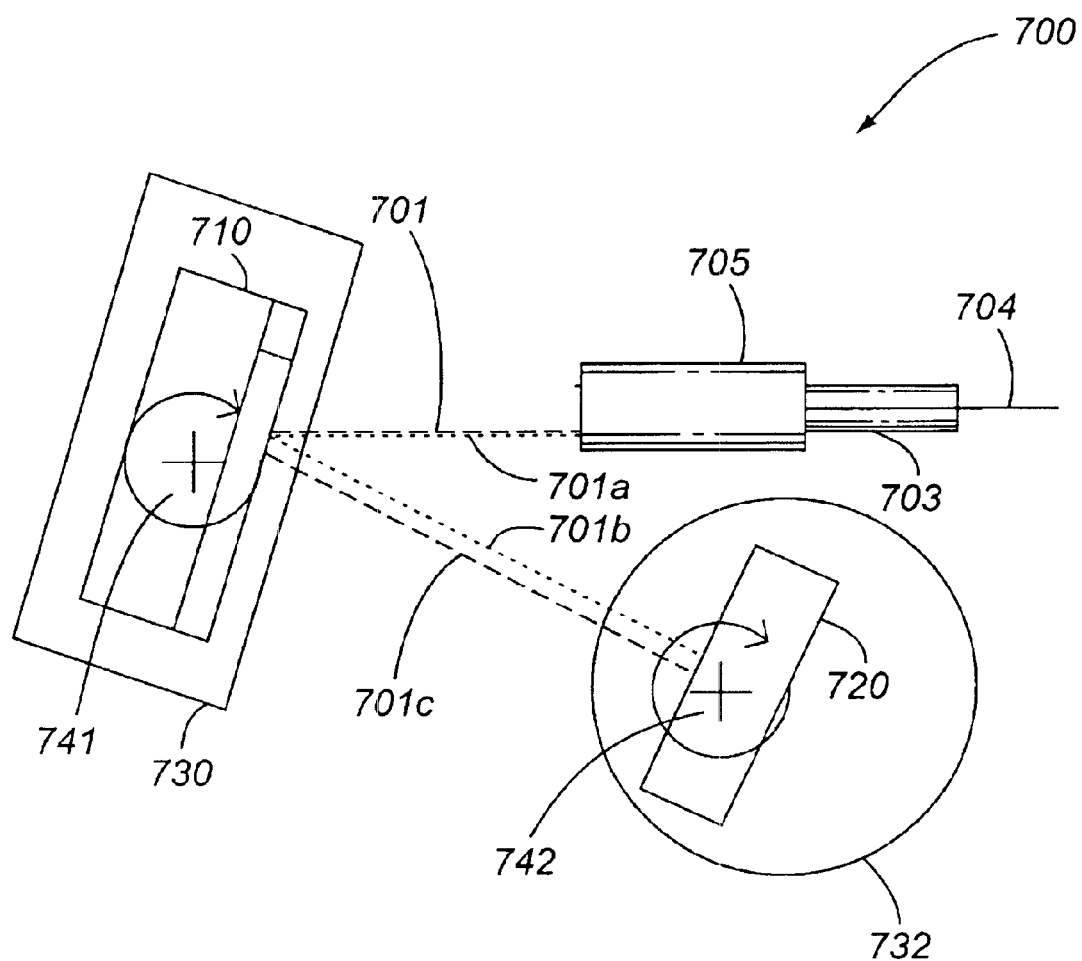
FIG. 7 is a plan view of a mechanically tunable 2:1:1 optical routing device schematically illustrating the function of the components using a ray diagram.

FIG. 7 illustrates yet another embodiment 700 of the invention providing an alternative method of altering the effective optical transfer characteristics of optical filter 710. Optical beam 701 is launched from optical fiber 704, which is encased in ferrule 703, through a lens 705. Optical filter 710 is disposed on tuning stage 730 for rotation about axis 741 such that the angle of incidence of optical beam segment 701a and 701c is selected. Reflective element 720 is also disposed on a second stage 732 to provide rotation about axis 742 such that optical beam segment 701b arrives at normal incidence from optical filter 710. Accordingly, the annular rotation of second stage 732 is preferably linked (by either mechanical coupling or a control circuit and electromechanical device not shown) to provide twice the angular rotation of tuning stage 730.

Figure 8:
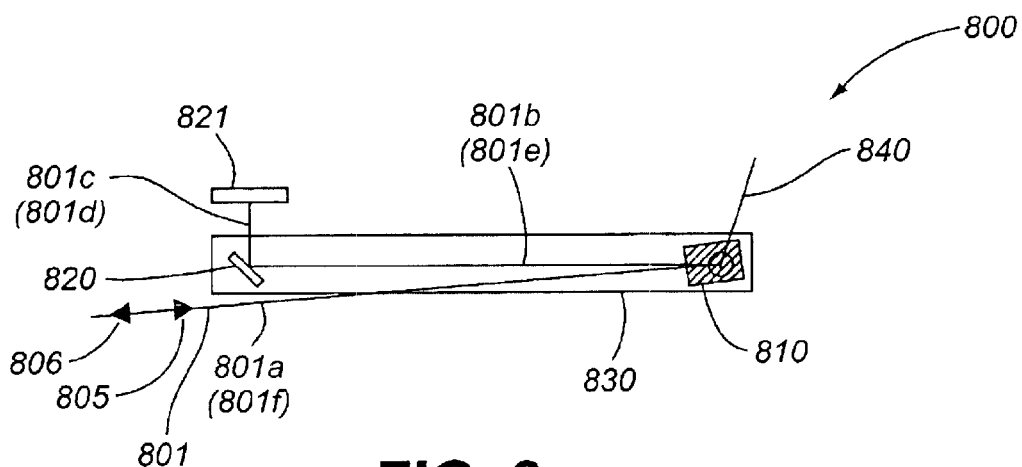
FIG. 8 is a plan view of an alternative mechanically tunable 2:1:1 optical routing device schematically illustrating the function of the components using a ray diagram.

FIG. 8 illustrates another embodiment of the invention in which the chromatic dispersion compensation of a 2:1:1 optical routing device 800 is selectively varied by mechanical motion of the etalon structure about an axis of rotation. Tuning stage 830 is rotated about axis 840, which is coincident with the center of etalon structure 810 to minimize the translation of the optical beam across the etalon during tuning. The first segment 801a of collimated optical beam 801 propagating in the direction of arrow 805 arrives at etalon structure 810. Etalon structure 810 is disposed on tunning stage 830 such that optical beam segment 801a arrives at oblique incidence and is in turn reflected toward first mirror 820 as optical beam segment 801b having an increased diameter. Optical beam segment 801b arrives at first mirror 820 at oblique incidence and is in turn reflected toward second mirror 821 as optical beam segment 801c. The first mirror 820 is disposed on the opposite side of tuning stage 830 such that its orientation does not change relative to the reflective surface of etalon structure 810. Second mirror 821 has a fixed orientation permitting the rotation of tuning stage 830 and etalon 810 about rotation axis 840 thus maintaining optical beam segment 801c at normal incidence therewith. Accordingly, optical beam segment 801c is in turn reflected back towards first mirror 820 as optical segment 801d. Optical beam segment 801d arrives at mirror 820 at oblique incidence and is in turn reflected back towards etalon 810 as optical segment 801e. Optical beam segment 801e arrives at etalon 810 at the same oblique angle of incidence on this second reflective pass, thus tracing the route of optical beam segment 801a but in the reverse direction. Optical beam segment 801e is then reflected by etalon structure 810 as optical beam segment 801f, but now is decreased to substantially equal beam diameter as optical beam segment 801a, thus exiting device 800 by propagating in the direction of arrow 806. The embodiment of FIG. 8 has a significant advantage over the embodiment of FIG. 7, in that only one rotating stage is required. FIG. 7 requires two rotating stages, which must rotate at different rates. In contrast, FIG. 8 with only one rotation stage, eliminates the requirement to have a second rotating stage which must accurately track the motion of the first rotating stage in order to maintain optical coupling between input and output. Generally, in order for the embodiment of FIG. 8 to work, that is to maintain normal incidence on mirror 821 regardless of the rotation angle of the tuning stage 830, the rotation axis of the tuning stage 830 must be substantially parallel to the plane of the etalon 840 and the plane of the mirror 820.

Figure 9:
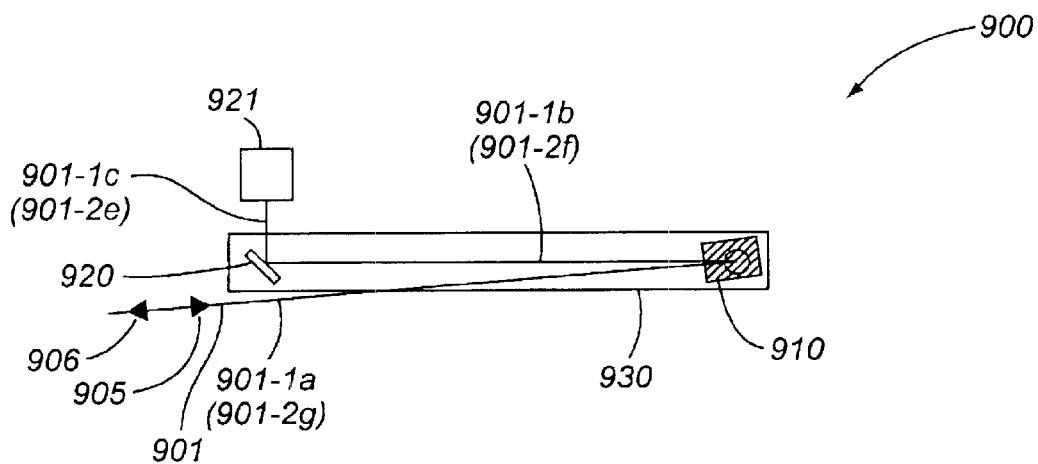
FIG. 9 is a plan view of a mechanically tunable 2:1:2 optical routing device schematically illustrating the function of the components using a ray diagram.

FIG. 9 illustrates yet another embodiment of the invention as a mechanically tunable 2:1:2 optical routing device. Note in the nomenclature adopted for each of the lettered segments of collimated optical beam 901 in device 900 the suffix -1 denotes propagation within a first layer, while the suffix -2 denotes propagation in a second layer defined by a plane parallel to the first layer, as it will be used in a likewise fashion in other figures. The plane common to optical beam segments 901-1a,b and c define layer 1 whereas optical beam segments 901-2e, f and g form a common plane defining layer 2. Optical beam segment 901-d is not shown, as it is oriented normal to the plane of the paper, propagating by total internal reflection in right angle prism 921. The first segment 901-1a of collimated optical beam 901 propagating in the direction indicated by arrow 905 arrives at etalon structure 910. Etalon 910 is disposed on tuning stage 930 such that optical beam segment 901-1a arrives at oblique incidence and is in turn reflected toward mirror 920 as optical beam segment 901-1b, having an increased cross-sectional dimension. Optical beam segment 901-1b arrives at mirror 920 at oblique incidence and is in turn reflected toward right angle prism 921 as optical beam segment 901-1c continuing to propagate is layer 1 of device 900. Right angle prism 920 deflects optical beam segment 901-1c out of the plane of the paper and then into the plane of the paper as segment 901-d within right angle prism 921. Optical beam segment 901-d is again totally internally reflected inside prism 921 such that it propagates in the second level of device 900, as optical beam segment 901-2e, back towards first mirror 920. Optical beam segment 901-2e arrives at mirror 920, which traverses layers 1 and layers 2 of device 900, at oblique incidence and is in turn reflected back towards etalon 910 as optical segment 901-2f. Optical beam segment 901-2f arrives at etalon 910, which also traverses layers 1 and 2 of device 900, at oblique incidence and is reflected as optical beam segment 901-2g, having substantially the same cross sectional dimension as optical beam segment 901-1a. Optical beam segment 901-2g of collimated optical beam 901 then exits device 900 propagating in the direction of arrow 906 in level 2 of the device. Accordingly, the collimated optical beam may then be collected by a lens for efficient coupling at an optical port, for retransmission in an optical fiber or waveguide.

Figure 10:
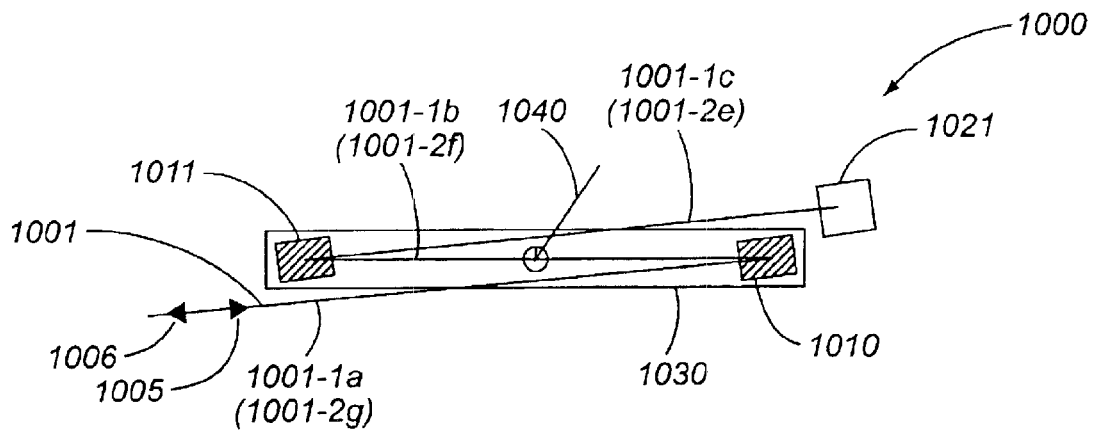
FIG. 10 is a plan view of a mechanically tunable 2:2:2 optical routing device schematically illustrating the function of the components using a ray diagram.

A mechanically tunable 2:2:2 optical routing device 1000 representing another embodiment of the invention is illustrated in FIG. 10. In this embodiment the optical beam traverses each of 2 etalon structures twice. As will be described in further detail, the etalon structures 1010 and 1011 are disposed on a common tuning stage 1030 having the centrally located axis of rotation 1040. The first segment 1001-1a of collimated optical beam 1001, propagating in the direction of arrow 1105, arrives at first etalon structure 1010. Etalon 1010 is disposed on tuning stage 1030 such that optical beam segment 100a arrives at oblique incidence and is in turn reflected toward second etalon 1011 disposed on the opposite side of tuning stage 1030, increasing in diameter as optical beam segment 1001-1b. Optical beam segment 1001-1b arrives at second etalon 1011 at oblique incidence and is in turn reflected toward right angle prism 1021 as optical beam segment 1001-1c, increasing in diameter but continuing to propagate in layer 1 of device 1000. Optical beam segment 1001-1c is normally incident on right angle prism 1021 irrespective of the rotation of tuning stage 1030 about axis 1040 such that right angle prism 1021 deflects optical beam segment 1001-1c out of the plane of the paper from level 1 of the device 1000 (as optical beam segment 1001-d which is not illustrated) and then into the plane of the paper, as optical beam segment 1001-2e, which continues to propagate in the second level of device 1000. Optical beam segment 1001-2e is in turn reflected back towards second etalon loll for a second reflective pass and thus relaying the optical beam between 2 etalon structures twice. Optical beam segment 1001-2e arrives at second etalon 1011, which traverses layers 1 and layers 2 of device 1000, at oblique incidence and is in turn reflected back towards first etalon 1010 as optical segment 1001-2f, decreasing in beam diameter. Thus while the reflections of optical beam segments 1001-1a and 1001-1b is layer 1 of the device off etalon structures 1010 and 1011 respectively resulted in increasing beam diameter from that of incident optical beam 1001, the return pass of optical beam 1001 via layer 2 of device 1000 provided an offsetting decreasing beam cross sectional dimension arising from the reflection of optical beam segments 100 1-2e and 1001-2f in sequence off etalon structures 1011 and 1010 respectively, wherein the final beam diameter is substantially equal to that of optical beam segment 1001-1a. Optical beam segment 1001-2g of collimated optical beam 1001 then exits device 1000 propagating in the reverse direction of arrow 1006 in layer 2 of device 1000, thus permitting a lens to efficiently collect and couple substantially all of the optical energy into an optical fiber or waveguide disposed at the optical port of the device.

Figure 11:
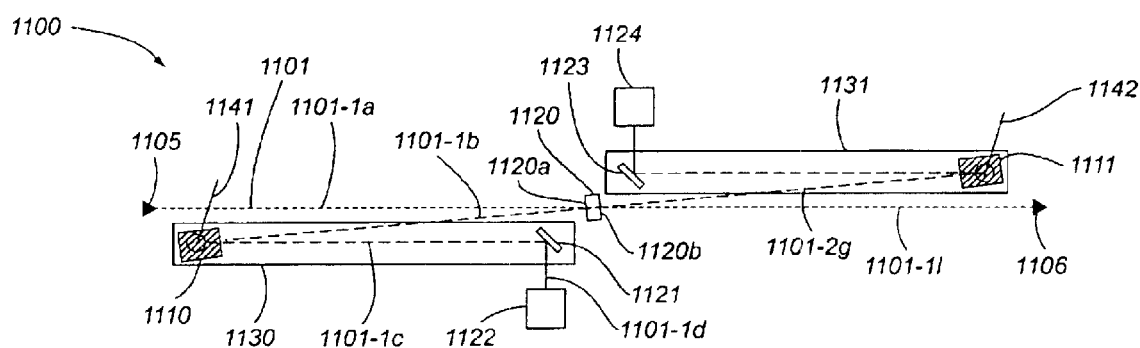
FIG. 11 is a plan view of an independently mechanically tunable 2:2:2 optical routing device schematically illustrating the function of the components using a ray diagram.

FIG. 11 illustrates yet another embodiment 1100 of the invention wherein a first tuning stage 1130 and a second tuning stage 1131, which are substantially the same as tuning stage 930 in FIG. 9, provide for the independent rotation of first etalon structure 1110 and second etalon structure 1111 about rotation axes 1141 and 1142 respectively for independent tuning of dispersion as described with respect to FIGS. 21a,b and c, supra. The first segment 1101-1a of collimated optical beam 1101 propagates in the direction of arrow 1105 and is first incident at reflective element 1120. Reflective element 1120 has reflective surfaces 1120a and 1120b disposed on opposite sides, and is optionally a double sided mirror or two sided mirror and the like, being disposed in a first layer of device 1100. The first layer of the device is defined by the plane common to optical beam segments 1101-1a,b,c and d. Reflective element 1120 is disposed such that optical beam segment 1101-1a arriving at oblique incidence is reflected as optical beam segment 1101-1b towards first etalon 1110. First etalon structure 1110 is disposed on the first tuning stage 1130 for rotation about axis 1141. Collimated optical beam 1101 is twice reflected off of each of etalon structures 1110 and 1111, via mirrors 1121 and 1123, respectively, 4404 as right angle prisms 1122 and 1124 twice relay various optical beam segments incident thereon between layers 1 and 2 of device 1100. Optical beam segment 1101-2g crosses between tuning stages 1130 and 1131 at layer 2 in device 1100 by passing over mirror 1120. The collimated optical beam 1101 exits device 1100 in layer 1 as indicated by arrow 1106 as optical beam segment 1101-11. Before exiting device 1100 collimated optical beam 1101 is twice reflected off etalon structure 1111 on the second tuning stage 1131 by relay reflection between the second side 1120b of mirror 1120 and the second right angle prism 1124 associated with the second tuning stage 1131.

Figure 12:
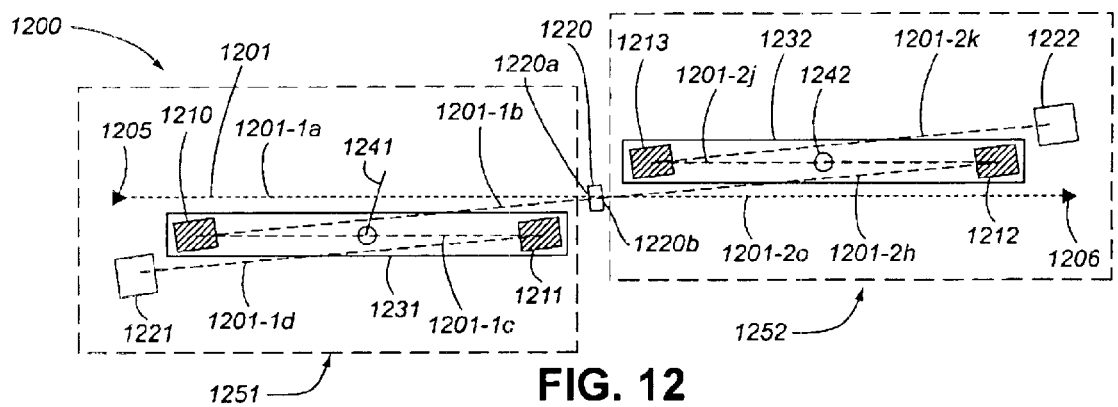
FIG. 12 is a plan view of an independently mechanically tunable 2:4:2 optical routing device schematically illustrating the function of the components using a ray diagram.

FIG. 12 illustrates yet another embodiment 1200 of the invention comprising a first subassembly 1251 (indicated by dashed lines) having a first tuning stage 1231 and a second subassembly 1252 (indicated by dashed lines) having a second tuning stage 1232. Each of subassembly 1251 and 1252 provide for the independent rotation of 2 pairs of etalon structures; that is a first pair of etalon structures comprising etalon structures 1210 and 1211 each having its reflective face oriented toward the other as mounted on opposite sides of tuning stage 1231, and a second pair of etalon structures comprising etalon structures 1212 and 1213 disposed on of tuning stage 1232 in the likewise configuration. Each of stages 1231 and 1232 are substantially the same as tuning stage 1030 in FIG. 10. Independent rotation of the first and second etalon structure pairs is achieved via rotation of each of tuning stages 1231 and 1232 about centrally located axes 1241 and 1242 respectively. Collimated optical beam 1201 arrives from the direction indicated by arrow 1205 and is first reflected between the first etalon structure pair on tuning stage 1231 after optical beam segment 1201-1a 4204a is reflected at surface 1220a on the first side of mirror 1220. Thus co-planar optical beam segments 1201-1a, 1201-1b. 1201-1c and 1201-1d, characterize layer 1 of device 1200. Optical beam segment 1201-2h reflects off of right angled prism 1221 and crosses between subassembly 1251 and 1252 at layer 2 in the device by passing over mirror 1220. Optical beam segments 1201-2h. 1201-21 and 1201-2k characterize layer 2 of the second tuning stage 1232. Optical beam segment 1201-2k reflects off of right angled prism 1222 back into layer 1. The collimated optical beam 1201 reflects off of surface 1220b on a second side of the mirror 1220, and exits device 1200 in layer 1 propagating in the direction of arrow 1206 as optical beam segment 1201-2o.

Figure 13:
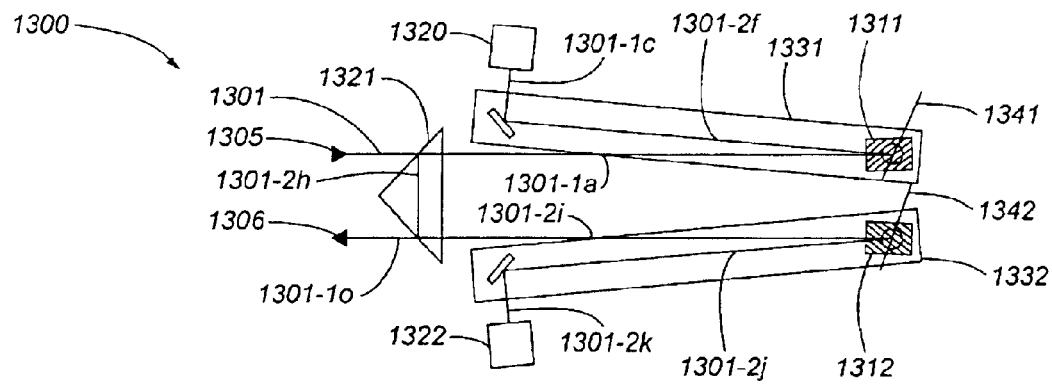
FIG. 13 is a plan view of an independently mechanically tunable 2:2:2 optical routing device schematically illustrating the function of the components using a ray diagram.

FIG. 13 illustrates another embodiment of the invention wherein device 1300 comprises tuning stages 1331 and 1332, each of which comprise an independently tunable etalon structure 1311 and 1312, rotating about axes 1341 and 1342, respectively. Optical beam 1301 enters the first tuning stage 1331 in the direction of arrow 1305, passing underneath a first right angle prism 1321 as optical beam segment 1301-1a. After reflecting off of etalon 1311, optical beam segment 1301-1c reflects up to layer 2 via a second right angle prism 1320. Optical beam segment 1301-2f reflects back off of etalon 1341 to the first right angle prism 1321. Optical beam segment 1301-2h crosses between tuning stages 1331 and 1332 at layer 2 in the device via the second right angle prism 1321. Optical beam segment 1301-2i reflects off of the second etalon 1312 as optical beam segment 1301-2j, which is directed towards the third right angled prism 1322 as optical beam segment 1301-2k. The third right angle prism 1322 associated with tuning stage assembly 1332 returns optical beam segment 1301 to level 1 of the device after reflection off etalon structure 1312. Accordingly, the final segment 1301-o of optical beam 1301 exits device 1300 by passing under the first right angle prism 1321, propagating as a collimated optical beam in the direction of arrow 1306.

Figure 14:
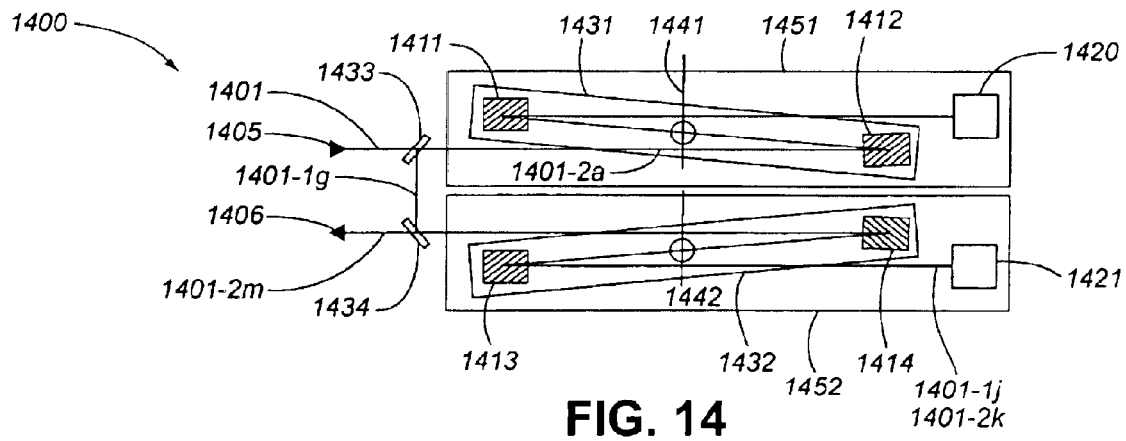
FIG. 14 is a plan view of an independently mechanically tunable 4:2:2 optical routing device schematically illustrating the function of the components using a ray diagram.

FIG. 14 illustrates another embodiment of the invention wherein device 1400 comprises tuning stages 1431 and 1432, each of which is mounted on respective subassemblies 1451 and 1452, rotatable about axes 1441 and 1442, respectively. The first tuning stage 1431 includes first and second etalon structures 1411 and 1412, respectively. The second tuning state includes first and second etalon structures 1413 and 1414, respectively. Each subassembly is substantially the same as tuning stage 1030 in FIG. 10 such that collimated optical beam 1401 enters subassembly at layer 2 arriving from the direction indicated by arrow 1405 as optical beam segment 1201-2a. Optical beam segment 1401-1g of collimated optical beam 1401 crosses between subassembly 1451 and 1452 at layer 1 having been translated from layer 2 to layer 1 on multiple reflection in right angle prism 1420. In this configuration a pair of mirrors 1433 and 1434 route the optical beam from the second etalon structure 1412 in tuning stage 1431 to the first etalon structure 1413 in tuning stage 1432. As right angle prism 1421 associated with second tuning stage 1431 returns optical beam segment 1401-1j as segment 1401-2k back to level 2, the collimated optical beam exits device 1400 by traveling above mirrors 1433 4-424 and 1434 4-422, propagating as a collimated optical beam 1401-2m in the direction of arrow, 1406.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. An optical device comprising:
   a) at least one multilayer interference filter disposed for receiving a first collimated optical beam having a first cross-section dimension at non normal incidence and reflecting the optical energy in said first collimated optical beam as a second collimated beam having a second cross-section dimension, wherein said at least one multiplayer interference filter provides wavelength dependent group delay providing chromatic dispersion compensation to wavelengths in the first collimated optical beam, and wherein said at least one multiplayer interference filter causes a beam broadening in said second collimated beam due to a walk-off of certain wavelengths therein, and
   b) at least one mirror for receiving the second collimated optical beam, wherein said at least one mirror is oriented to reflect said second collimated optical beam back to said at least one multiplayer interference filter to substantially compensate for the beam broadening, whereby a third collimated optical beam is generated, the third collimated optical beam having substantially the same optical energy and cross-section dimension as said first collimated optical beam.

2. A dispersion compensation device:
   a) at least one etalon structure, disposed for receiving a first collimated optical beam having a first diameter at non normal incidence and reflecting the optical energy in said first collimated optical beam as a second collimated beam having a second diameter, comprising;

at least one optical cavity having a first and a second surface, and at least one dielectric mirror in optical communication with the first and second surfaces of each optical cavity; said dielectric mirror comprising a plurality of alternating layers of thin films having at least a first and a second refractive index;

wherein the reflectivity of said dielectric mirrors is selected so that the at least one etalon provides wavelength dependent group delay to provide compensation for chromatic dispersion without substantial attenuation of optical signal energy, and wherein reflection from the etalon causes beam broadening in the second collimated beam due to a walk-off of certain wavelengths therein;

b) at least one mirror for receiving the second collimated optical beam, wherein said at least one mirror is oriented to reflect said second collimated optical beam back to said at least one etalon structure to substantially compensate for said beam broadening, whereby a third collimated optical beam having substantially the same optical energy and diameter as said first collimated optical beam is generated.

3. A dispersion compensation device according to claim 2 wherein said at least one mirror is disposed at normal incidence to said second optical beam such that the third optical beam is generated on reflection from said at least one etalon structure and is directed in the opposite direction and parallel to said first collimated optical beam.

4. An optical device according to claim 1 wherein said at least one mirror is a multilayer interference filter.

5. A dispersion compensation device according to claim 2, wherein said at least one mirror is a multilayer interference filter.

6. A dispersion compensation device according to claim 2 wherein the chromatic dispersion of said at least one etalon structure is tunable.

7. A dispersion compensation device according to claim 5 wherein the chromatic dispersion of said at least one etalon structure is tuned by changing the thickness of at least one optical cavity.

8. A dispersion compensation device according to claim 5 wherein the chromatic dispersion of said at least one etalon structure is tuned by rotating at least one etalon structure to change the angle of incidence of said collimated optical beam.

9. A dispersion compensation device according to claim 5 wherein the chromatic dispersion of said at least one etalon structure is tuned by rotating at least one etalon structure by angle alpha to change the angle of incidence of said collimated optical beam and said at least one mirror is rotated 2 times angle alpha so as to be disposed at normal incidence to said second optical beam such that the third optical beam is generated on reflection from said at least one etalon structure and is directed in the opposite direction and parallel to said first collimated optical beam.

10. A dispersion compensation device according to claim 2 further comprising a second etalon structure disposed between said first etalon structure and said mirror wherein said at least one mirror is disposed at normal incidence to said second optical beam such that the third optical beam is generated on reflection from said first etalon and said second etalon structure and is directed in the opposite direction as said first collimated optical beam.

11. An optical device comprising:

one or more multilayer interference filters, at least one multilayer interference filter being disposed for receiving a first collimated optical beam having a first diameter at non normal incidence, and reflecting said collimated optical beam, wherein said multiplayer interference filters provide wavelength dependent group delay for providing chromatic dispersion compensation to wavelengths in the first collimated optical beam, and wherein said at least one multiplayer interference filter causing a beam broadening in said second collimated beam due to a walk-off of certain wavelengths therein; and means for reversing the direction of said collimated optical beam reflected off said multilayer interference filter for making a second reflective pass off of at least one of said multilayer interference filter to substantially compensate for said beam broadening, whereby a second collimated optical beam having substantially the same optical energy and diameter as said first collimated optical beam is generated.

12. An optical device according to claim 11, wherein said multilayer interference filter is an etalon or multicavity etalon.

13. An optical device according to claim 11, wherein said reversing means comprises a reflective element selected from the group consisting of a prism, a right angle prism, a corner cube and multiple single sided mirrors.

14. An optical device, according to claim 11 further comprising means for rotating said multilayer interference filter to change the angle of incidence of said collimated optical beam.

15. An optical device, according to claim 14 further comprising means for rotating said means for reversing the direction of said collimated optical beam.

16. An optical device according to claim 14 wherein said means for reversing comprises a plurality of cooperating reflective surfaces, and wherein said means for rotating said multilayer interference filter comprises:

a) a first tuning stage for mounting at least one multilayer interference filter having a first axis such that rotation of said tuning stage about said first axis rotates at least one reflective surface of said means for reversing, at least one further cooperating reflective surface remaining stationary.

17. An optical device according to claim 16, wherein at least one of the cooperating reflective surfaces is a multilayer interference filter or etalon.

18. An optical device according to claim 16 wherein said first axis of rotation is disposed substantially parallel to a reflective plane of said multilayer interference filter and to a plane of the at least one reflective surface rotated by the tuning stage.

19. An optical device, according to claim 16 having a second multilayer interference filter mounted on said tuning stage opposite said first multilayer interference filter wherein the axis of rotation is disposed between said first multilayer interference filter and said second multilayer interference filter.

20. An optical device, according to claim 16 further comprising a second tuning stage for mounting a second multilayer interference filter, the second tuning stage having a second axis such that such that rotation of said second tuning stage about said second axis rotates said second multilayer interference filter to change the angle of incidence of said collimated optical beam upon it.

21. An optical device, according to claim 20 further comprising means for relaying said collimated optical beam between said first tuning stage and said second tuning stage.

22. An optical device according to claim 21 wherein:

a) said first tuning stage is associated with a first plane defined by the optical beam segment propagating therewithin;

b) said second tuning stage is associated with a second plane defined by the optical beam segment propagating therewithin; and c) the first and second planes are parallel to each other.

23. An optical device according to claim 22 wherein said relaying means comprises two or more reflective surfaces for receiving said collimated optical beam from said first plane and reflecting it toward said second plane and reflecting it toward a multilayer interference filter in said second plane.

* * * * *

UNITED STATES PATENT AND TRADEMARK OFFICE
CERTIFICATE OF CORRECTION

PATENT NO. : 6,870,679 B2
DATED : March 22, 2005
INVENTOR(S) : Randall et al.

It is certified that error appears in the above-identified patent and that said Letters Patent is hereby corrected as shown below:

Column 12,
Line 41, "annular" should read -- angular --.

Column 14,
Line 11, "segment 100a" should read -- segment 1001-1a --.
Line 28, "etalon loll" should read -- etalon 1011 --.
Line 60, "right angle prism" should read -- right angled prism --.

Column 15,
Line 43, "1201-2h. 1201-2l and" should read -- 1201-2$h$, 1201-2$j$ and --.

Column 16,
Line 3, "segment 1301-$o$" should read -- segment 1301-1$o$ --.
Line 13, "turning state includes" should read -- turning stage includes --.

Column 18,
Line 2, "said multiplayer" should read -- said one or more multilayer --.
Line 6, "multiplayer" should read -- multilayer --.
Line 7, "in said second" should read -- in said reflected --.

Signed and Sealed this

Twenty-fifth Day of October, 2005

JON W. DUDAS
*Director of the United States Patent and Trademark Office*